United States Patent
Nose

(10) Patent No.: US 8,307,280 B2
(45) Date of Patent: Nov. 6, 2012

(54) LABEL DATA CREATING APPARATUS, LABEL DATA CREATING METHOD, AND COMPUTER PROGRAM PRODUCT

(75) Inventor: Tetsuya Nose, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 999 days.

(21) Appl. No.: 12/286,957

(22) Filed: Oct. 3, 2008

(65) Prior Publication Data
US 2009/0106649 A1    Apr. 23, 2009

(30) Foreign Application Priority Data
Oct. 4, 2007    (JP) .................................. 2007-260555

(51) Int. Cl.
*G06F 17/00* (2006.01)
(52) U.S. Cl. .................. 715/255; 715/243; 715/273
(58) Field of Classification Search ............... 715/243, 715/255–256, 273–274
See application file for complete search history.

(56) References Cited

U.S. PATENT DOCUMENTS

| | | | |
|---|---|---|---|
| 7,052,196 B2 | 5/2006 | Ueno et al. | |
| 2002/0074408 A1 | 6/2002 | Torchalski | |
| 2005/0006469 A1* | 1/2005 | Nonneman et al. | 235/384 |
| 2005/0223323 A1* | 10/2005 | Tanaka et al. | 715/526 |
| 2005/0243370 A1* | 11/2005 | Imai et al. | 358/1.18 |
| 2006/0072155 A1* | 4/2006 | Ryu et al. | 358/1.15 |
| 2007/0162844 A1* | 7/2007 | Woodall et al. | 715/517 |

FOREIGN PATENT DOCUMENTS

| | | | |
|---|---|---|---|
| EP | 1227407 A2 | | 7/2002 |
| EP | 1557277 A1 | | 7/2005 |
| EP | 1582993 A2 | | 10/2005 |
| JP | 04-127266 | | 4/1992 |
| JP | 2001-010127 | | 1/2001 |
| JP | 2004148758 | | 5/2004 |
| JP | 2005292964 A | * | 10/2005 |
| JP | 2006099261 A | * | 4/2006 |
| JP | 2006-209564 | | 8/2006 |

* cited by examiner

*Primary Examiner* — Chau Nguyen
(74) *Attorney, Agent, or Firm* — McCarter & English, LLP

(57) ABSTRACT

If a plurality of objects arranged on a layout and including text, word art or bar code are selected and a command is entered from the menu window to create link objects, a CPU sets an object ranked as first as a parent object constituting the link object and stores the parent object in the RAM, with a group ID for identifying the link object allocated thereto. The CPU sets the remaining objects as child objects and stores the objects in the RAM, with a group ID for identifying the link object allocated thereto.

9 Claims, 22 Drawing Sheets

FIG. 9

| SHEET DISCRIMINATION SENSOR | ROLLED SHEET TYPE |
|---|---|
| 110100 | 12mm NON-FIXED LENGTH |
| 110101 | 17mm NON-FIXED LENGTH |
| 110110 | 29mm NON-FIXED LENGTH |
| 110111 | 38mm NON-FIXED LENGTH |
| 111000 | 62mm NON-FIXED LENGTH |
| 111001 | 12mm DIE CUT1 |
| 111010 | 29mm DIE CUT1 |
| 111011 | 38mm DIE CUT1 |
| 111100 | 62mm DIE CUT1 |
| • | • |
| • | • |
| • | • |

FIG. 10

| DIE CUT TYPE | WIDTH × LENGTH |
|---|---|
| 12mm DIE CUT1 | 12mm × 54mm |
| 12mm DIE CUT2 | 12mm × 90mm |
| 17mm DIE CUT1 | 17mm × 54mm |
| 17mm DIE CUT2 | 17mm × 90mm |
| 29mm DIE CUT1 | 29mm × 90mm |
| 38mm DIE CUT1 | 38mm × 90mm |
| 62mm DIE CUT1 | 62mm × 29mm |
| 62mm DIE CUT2 | 62mm × 100mm |
| • | • |
| • | • |
| • | • |

LABEL DATA CREATING APPARATUS, LABEL DATA CREATING METHOD, AND COMPUTER PROGRAM PRODUCT

CROSS-REFERENCE TO RELATED APPLICATIONS

The present application claims priority from Japanese Patent Application No. 2007-260555, filed on Oct. 4, 2007, the disclosure of which is hereby incorporated by reference in its entirety.

TECHNICAL FIELD

The disclosure relates to a label data creating apparatus, a label data creating method, and a computer program product for creating and editing print data to be printed on a long print medium.

BACKGROUND

Conventionally, various kinds of technologies have been suggested for creating and editing print data to be printed on a print medium such as a long tape or a rolled sheet or the like.

For instance, a tape printing control device comprises: a first storage section for storing a first character string to be printed on a tape-like print medium; a first image generation section for generating a print image in which the first character string stored in the first storage section is arranged along a width direction of the tape-like print medium; a second image generation section for generating a print image in which the first character string stored in the first storage section is arranged along a lengthwise direction of the tape-like print medium; and a print control section for executing print control so that the print image generated by one of the first and second image generation sections will be printed on the tape-like print medium first and thereafter the print image generated by the other will be printed on the tape-like print medium (for example, Japanese Unexamined Patent Publication No. 2004-148758).

However, with the structure disclosed in the above-mentioned Japanese Unexamined Patent Publication No. 2004-148758, after a plurality of objects have been inputted to a print area of the print medium for printing, if these objects are changed to and printed as objects including a first type of information, which is the same as the information included in any of the objects, the rest of the objects all have to be changed to objects including same information. This makes the change operation complicated.

SUMMARY

The disclosure has been made in view of the above circumstances and has an object to overcome the above problems by providing a label data creating apparatus, a label data creating method ad a computer program product which make it possible to easily change a plurality of objects inputted to a print area on a layout to objects including one type of information which is the same as the information included in one of the objects.

To achieve the purpose of the disclosure, there is provided a label data creating apparatus comprising a display having a display screen, a layout display unit that displays a layout of a long print medium onto which print data is to be printed, in the display screen of the display, an input device that is used in inputting an object in a print area of said layout, an object storage unit that stores said object inputted through the input device, the object having a rank allocated thereto, a select device that is used in selecting objects inputted into the print area, and a link object setting unit that, in a case where a plurality of objects are selected by the select device, sets an object ranked as first from amongst said plurality of objects thus selected as a parent object, and sets an object ranked as second or lower as a child object including identical information with the parent object, for creating a group.

In the label data creating apparatus, the user selects the plurality of objects inside the print area using the select device. This makes it possible to group the plurality of objects in the print area and set the objects to an object including a first type of information which is the same as that included in an object which is ranked as first in the group. Accordingly, the user can easily change the plurality of objects thus inputted in the print area on the layout to an object including a first type of information which is the same as information included in a parent object ranked as first.

According to another aspect of the disclosure, there is provided a label data creating method comprising a layout display step of displaying a layout of a long print medium onto which print data is printed, on a display screen of a display, an input step of inputting an object to a print area of said layout displayed in said layout display step, through an input device, an object storage step of storing said object inputted in said input step, said object having a rank allocated thereto, and a link object setting step of setting, in a case where a plurality of objects which are inputted to the print area in said input step are selected by a select device, an object ranked as first from amongst said plurality of objects thus selected and stored in the object storage step, as a parent object, and setting an object ranked as second or lower as a child object including identical information with the parent object, for creating a group.

In the label data creating method, the user selects the plurality of objects inside the print area. This makes it possible to group the plurality of objects in the print area and set the objects to an object including a first type of information which is the same as an object ranked as first in the group. Accordingly, the user can easily change the plurality of objects thus inputted in the print area on the layout to an object including a first type of information which is the same as information including a parent object ranked as first.

According to still another aspect of the disclosure, there is provided a computer program product used and executed by a label data creating apparatus comprising, a computer readable recording medium, and a computer program stored in the computer readable recording medium, wherein the computer program includes, a layout display step of displaying a layout of a long print medium onto which print data is printed, on a display screen of a display, an input step of inputting an object to a print area of said layout displayed in said layout display step, through an input device, an object storage step of storing said object inputted in said input step, said object having a rank allocated thereto, and a link object setting step of setting, in a case where a plurality of objects which are inputted to the print area in said input step are selected by a select device, an object ranked as first from amongst said plurality of objects thus selected and stored in the object storage step, as a parent object, and setting an object ranked as second or lower as a child object including identical information with the parent object, for creating a group.

In the computer program product, the computer loads the program stored in the record medium and selects a plurality of objects inside the print area. In this case, the computer groups the plurality of objects in the print area and sets the objects to an object including a first type of information which is the same as that included in an object ranked as first in the group. Accordingly, the user selects the plurality of objects inside the print area, which makes it possible to easily change the plurality of objects thus inputted in the print area on the layout to an object including a first type of information which is the same as information included in a parent object ranked as first.

BRIEF DESCRIPTION OF THE DRAWINGS

FIG. 9 is a view showing one example of a sheet type table stored in the ROM of the tape printer;

FIG. 10 is a view showing one example of a die cut type table stored in the ROM of the tape printer;

DETAILED DESCRIPTION

A detailed description of one exemplary embodiment of a label data creating apparatus, a label data creating method, and a computer program product as applied to a label printing system according to the disclosure will now be given referring to the accompanying drawings.

Figure 1:
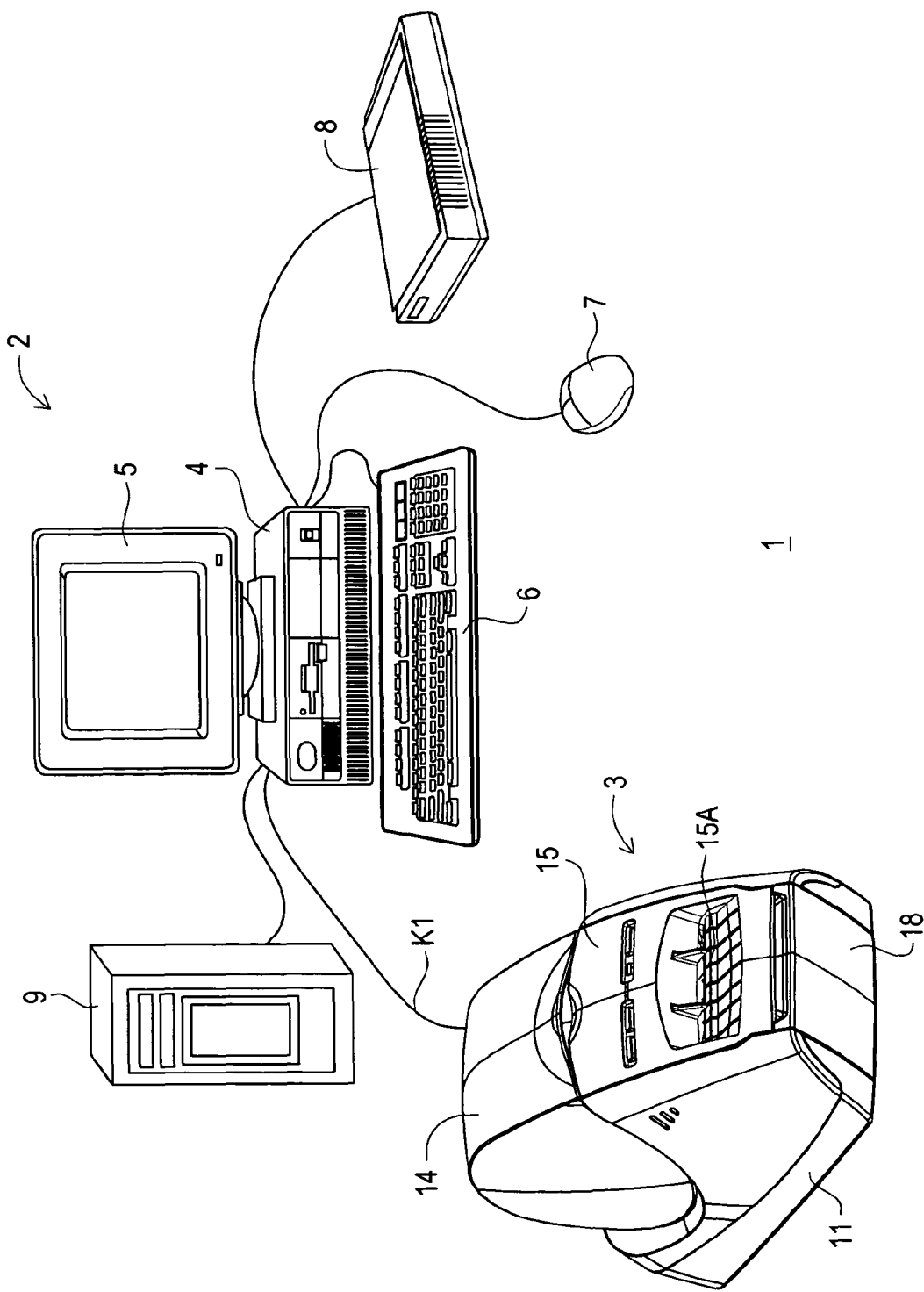
FIG. 1 shows a schematic configuration of a label printing system according to a preset embodiment.

First, a schematic configuration of a label printing system 1 according to the present embodiment will now be described based on FIG. 1. As shown in FIG. 1, the label printing system 1 according to this embodiment is composed of a computer device 2, given as one example of a label data creating apparatus and including a personal computer and the like; and a tape printer 3 connected to the computer device 2 through a signal cable K1.

The computer device 2 comprises a host controller 4, a display device (such as CRT, LCD and the like) 5, a keyboard 6, a mouse 7, an image scanner 8, and a CD-R/W drive 9. It is noted that the mouse 7 may be replaced with a joy stick or a track ball. CD-RW drive 9 may also be substituted by a MO device or a DVD device.

Next, a general configuration of a tape printer 3 will be described based on FIG. 2 through FIG. 5.

Figure 2:
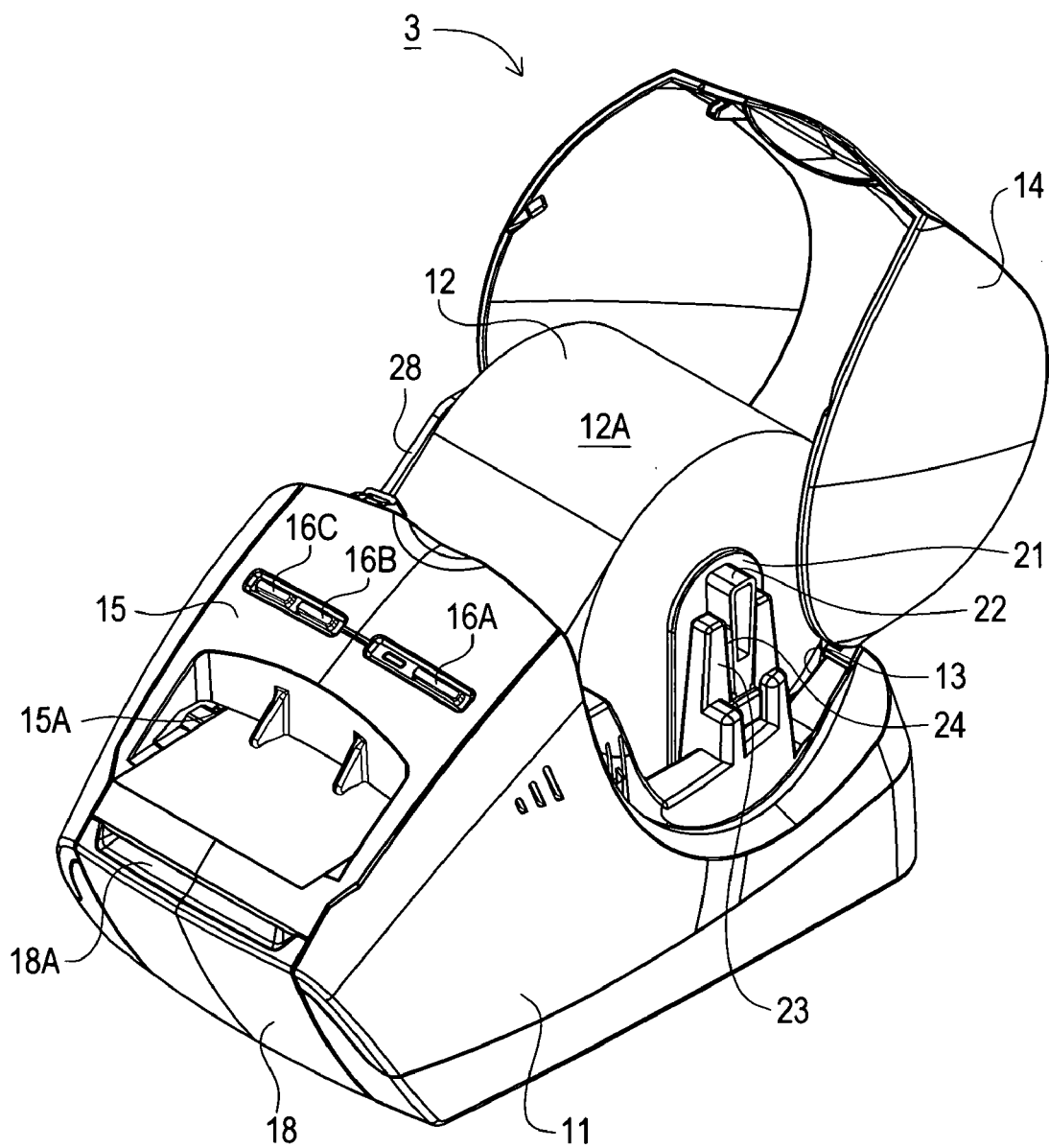
FIG. 2 is a perspective view taken from an upper right side of a tape printer as shown in FIG. 1, with a top cover thereof open, and a rolled sheet holder mounted therein.
Figure 5:
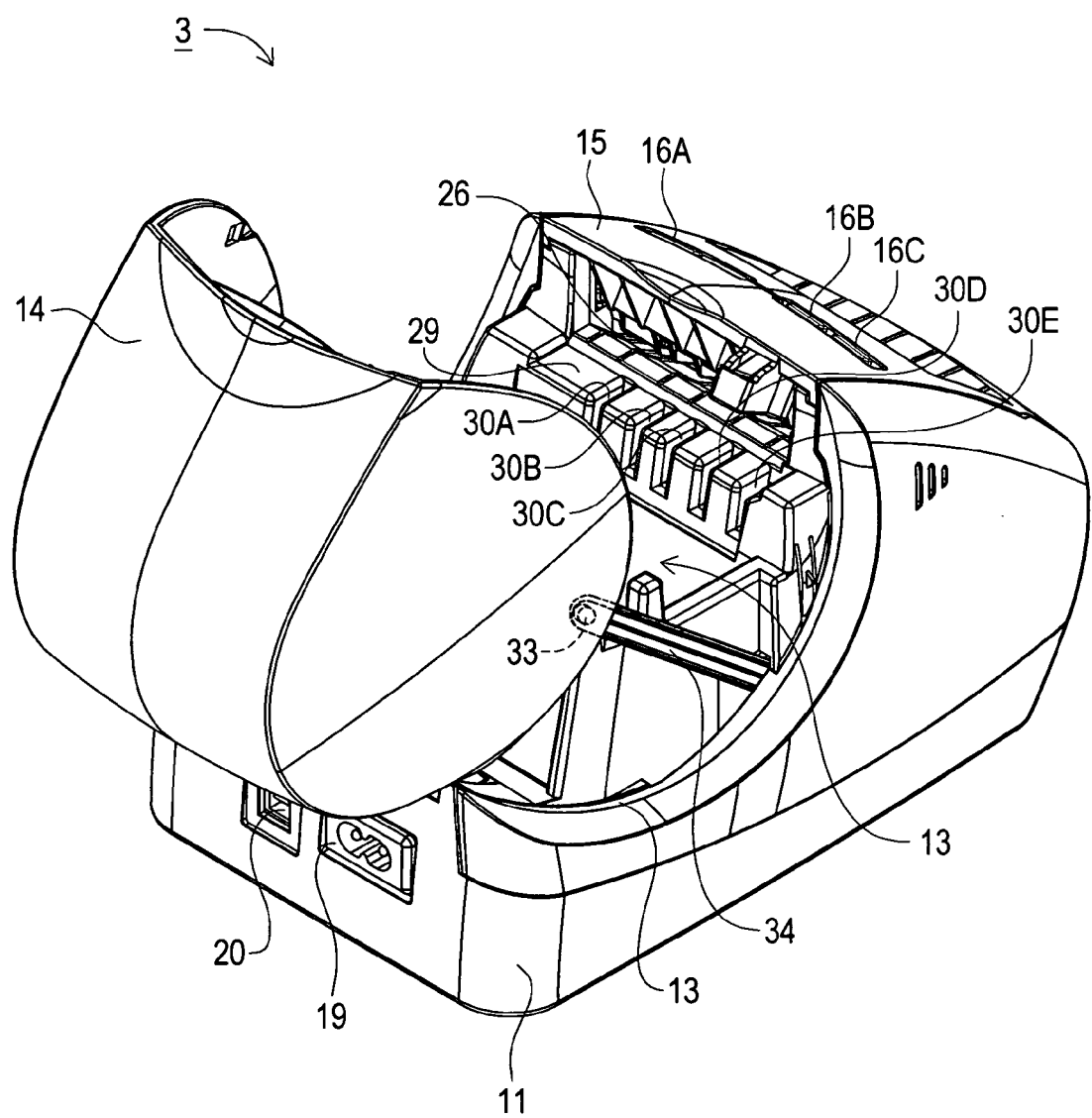
FIG. 5 is a perspective view taken from an upper left rear side of the tape printer, with the top cover thereof open.

As shown in FIG. 2 thorough FIG. 5, the tape printer 3 includes a resin body case 11, a rolled sheet holder 12, a rolled sheet holder housing section 13 and a top cover 14. The rolled sheet holder housing section 13 houses the rolled sheet holder 12 having rolled sheet 12A of a predetermined width wound thereon. The top cover 14 is made of a transparent resin and is formed in a substantially semicircular shape in side view, being fixed to a rear upper edge part of the tape printer 3, in a freely openable manner so as to cover the upper side of the rolled sheet holder housing section 13. The rolled sheet 12A is wound up on the rolled sheet holder 12 and includes a long thermal sheet (so called, thermal paper) having self color development characteristics, a non-fixed length rolled sheet 12A obtained by adhering a release sheet to one side of the thermal sheet through an adhesive agent, or a die cut and the like obtained by half-cutting the thermal sheet of this non-fixed length rolled sheet 12A in a predetermined shape with a fixed pitch.

A sheet discharging port 15A through which the printed rolled sheet 12A is discharged outside is formed on the front cover 15 at a front side of the top cover 14. A power button 16A, a cut button 16B and a feed button 16C are arranged substantially in a horizontal manner on a front surface at an upper side of the sheet discharging port 15A. Upon being depressed, the cut button 16B drives a cutter unit 17 (refer to FIG. 3) provided inside the sheet discharging port 15A to cut the rolled sheet 12A. Upon being depressed, the feed button 16C discharges the rolled sheet 12A by a fixed amount in the conveying direction.

Figure 3:
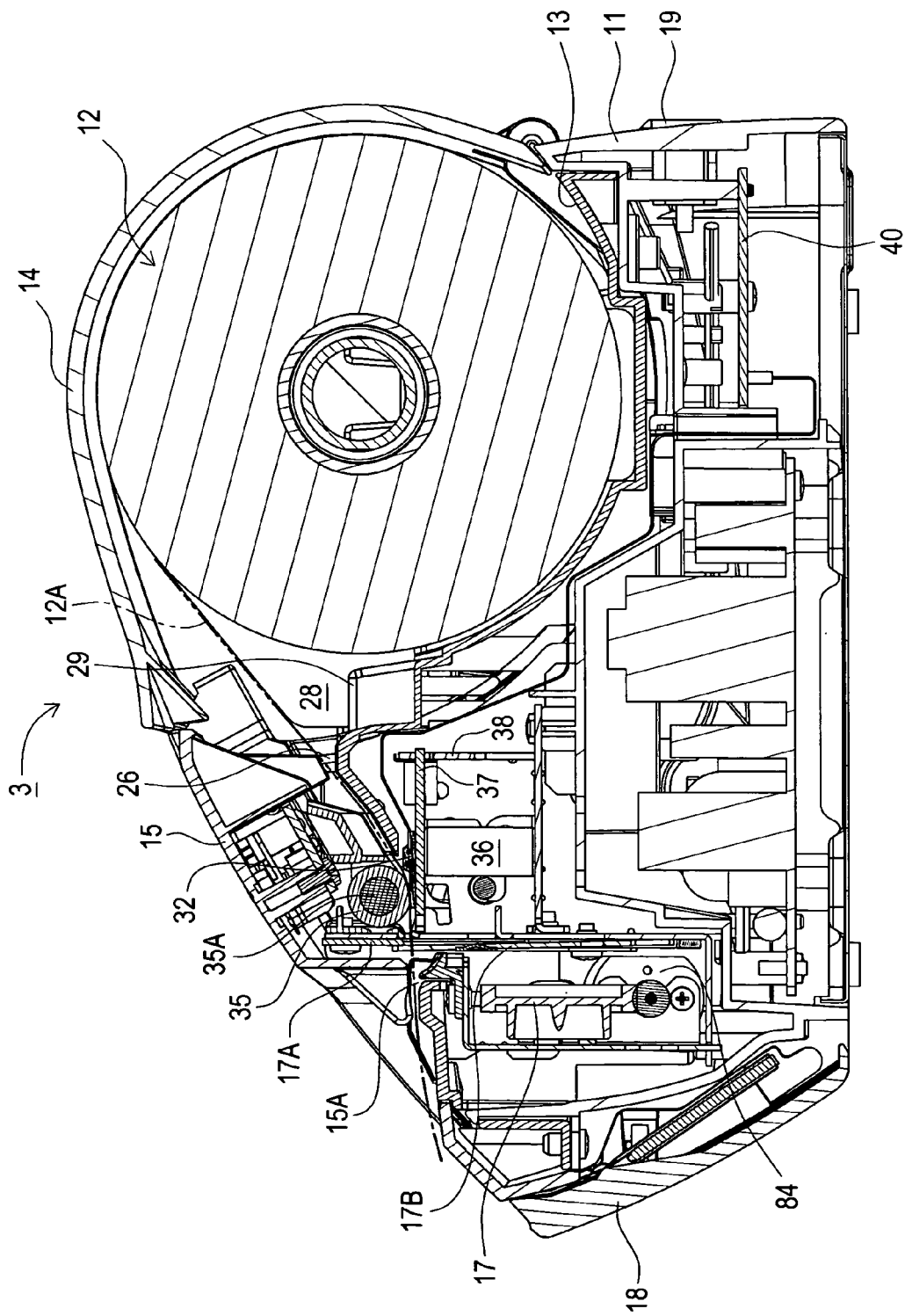
FIG. 3 is a sectional side view showing the state wherein the rolled sheet holder is mounted in the tape printer.

Here, as shown in FIG. 3, the cutter unit 17 is composed of a fixed blade 17A and a movable blade 17B. The movable blade 17B is operated to move in a vertical direction by a cutting motor 84 including a DC motor or the like. The printed rolled sheet 12A is conveyed so that a cutting position at a rear side in a conveying direction reaches a position facing the fixed blade 17A. At this point, the cutting motor 84 causes the movable blade 17B to move in a vertical direction, cutting the printed rolled sheet 12A. Also, the rolled sheet 12A that was cut by the fixed blade 17A and the movable blade 17B is discharged from the sheet discharging port 15A. The movable blade 17B is formed in a V-shape, in front view.

As shown in FIG. 2 and FIG. 3, a tray member 18 is fixed to a lower edge part of the front cover 15 in a freely openable manner so as to cover the front side of the front cover 15. The tray member 18 can be opened by placing a finger in a recess portion 18A formed at an upper end part and pushing towards the front side.

As shown in FIG. 5, an inlet 19 to which a power cord not shown is connected is provided at a rear part of the body case 11, and at the same time, a USB (Universal Serial Bus) connector 20 to which a signal cable K1 is connected is provided at a side part (in FIG. 5, the left side) thereof.

Figure 4:
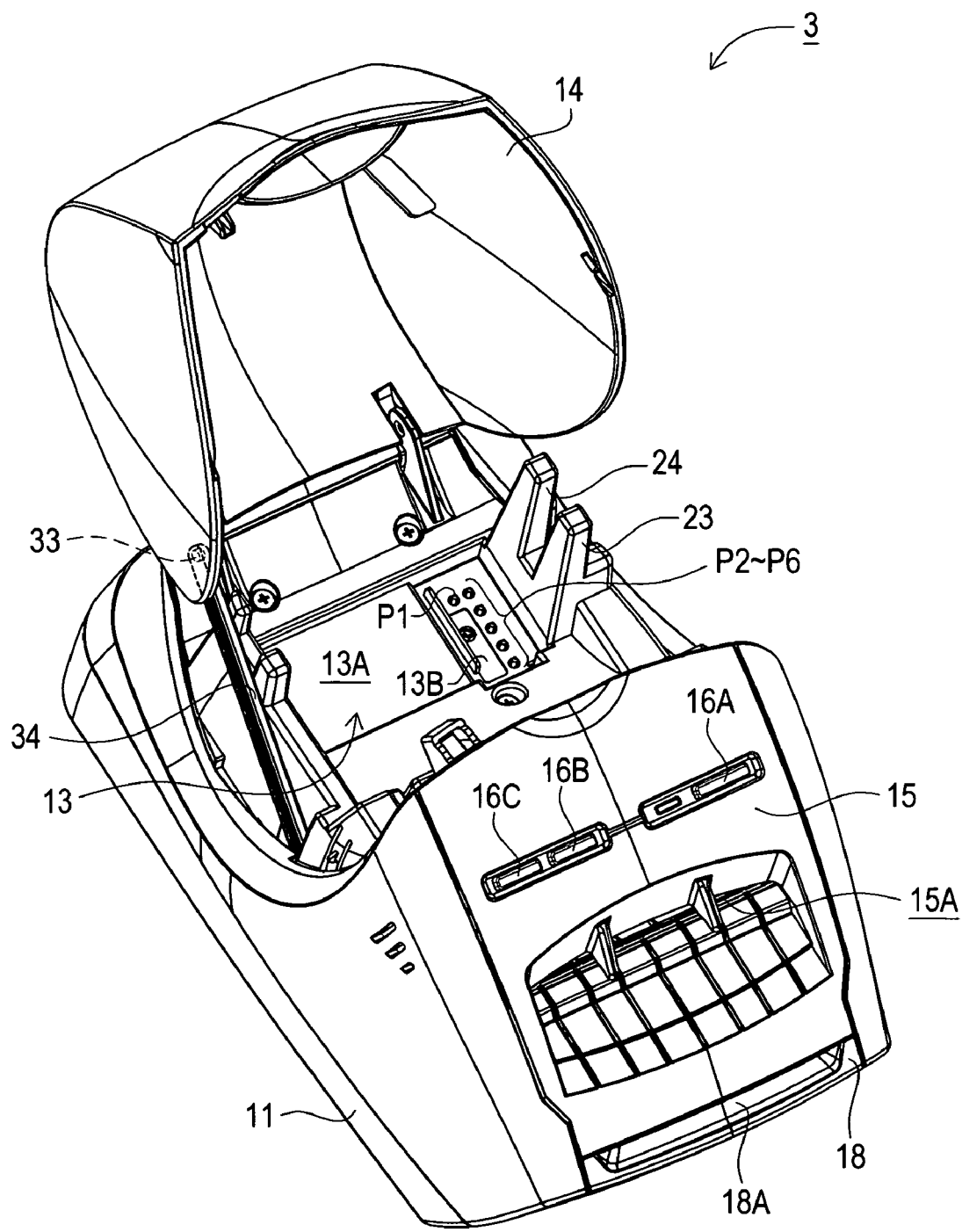
FIG. 4 is a perspective view taken from an upper left front side of the tape printer, with the top cover thereof open.

As shown in FIG. 2, FIG. 4 and FIG. 5, the tape printer 3 has a holder support member 23 provided at one side edge part (in FIG. 2, the right-side edge part) of the rolled sheet holder housing section 13, in a substantially perpendicular direction with respect to a conveying direction. The holder support member 23 can fit a fixing member 22 which has a substantially rectangular shape in cross section and is projected in an outer direction of a holding member 21 constituting a rolled sheet holder 12. This holder support member 23 has a first positioning groove part 24 formed therein, the groove being U-shaped in a substantially longitudinal direction in front view. The groove opens upward in a width direction and at the same time, at both sides in a width direction.

A loading portion 29 is also provided which extends in a substantially horizontal direction between a rear edge part of an insertion opening 26 (refer to FIG. 3) into which the rolled sheet 12A is inserted, and a front upper edge part of the rolled sheet holder housing section 13. Five second positioning groove parts 30A through 30E having a substantially L-shape in cross section are formed at a rear edge corner of the loading part 29 in a conveying direction, at each position corresponding to a plurality of width dimensions of the rolled sheet 12A. The respective second positioning groove parts 30A through 30E are formed so as to enable fitting, from upwards, of a tip lower end part of a guide member 28 that constitutes the rolled sheet holder 12, which tip lower end part comes in contact with the loading part 29, as shown in FIG. 3.

A positioning recess part 13A is formed in a bottom part of the rolled sheet holder housing section 13. The positioning recess part 13A is rectangular in plan view and long sideways in a substantially perpendicular direction with respect to a conveying direction, and extends between an inner base end part and an opposite side base end part of the holder supporting member 23. The positioning recess part 13A has a predetermined depth (in the present embodiment, approximately 1.5 through 3 mm). The positioning recess part 13A is formed so that the width dimension in a conveying direction is substantially equal to the width dimensions of the respective lower edge parts of the holding member 21 and guide member 28 constituting the rolled sheet holder 12.

A discrimination recess part 13B is formed at the inner base end part of the holder support member 23 of the positioning recess part 13A. The discrimination recess part 13B is rectangular in plan view and long in a longitudinal direction with respect to a conveying direction. The discrimination recess part 13B is formed so that a portion facing the sheet discrimination part 60 (refer to FIG. 6) extending inward from a lower edge part of the holding member 21 at a substantially right angle therewith is formed to be deeper than the positioning recess part 13A by a predetermined depth (in the present embodiment, approximately 1.5 through 3 mm deep).

The discrimination recess part 13B is provided with six discrimination sensors P1, P2, P3, P4, P5 and P6 arranged in an L-shaped pattern, for distinguishing the type, material, width and the like of the rolled sheet 12A. These sensors are each constructed of a push-type micro-switch, etc.

These sheet discrimination sensors P1 to P6 are each constructed of a well known mechanical switch including a plunger and a micro-switch, etc. Each plunger is placed so that an upper end part thereof protrudes from the bottom part of the discrimination recess part 13B to the vicinity of the bottom part of the positioning recess part 13A. It is detected whether the sheet discrimination part 60, which extends inward from the lower edge part of the holding member 21 at a substantially right angle therewith, has sensor holes 60A to 60F (see FIG. 6), mentioned later, at the positions corresponding to the sheet discrimination sensors P1 to P6 respectively. Based on an ON/OFF signal representing a detection result by the sensors P1 to P6, the type, material, width and the like of the rolled sheet 12A loaded in the rolled sheet holder 12 are detected.

In the present embodiment, the plungers of the sheet discrimination sensors P1 to P6 normally protrude from the bottom surface of the discrimination recess part 13B to the vicinity of the bottom surface of the positioning recess part 13A. At this time, each micro-switch is in an OFF state. In the case where the sheet discrimination part 60 has sensor holes 60A through 60F at the positions corresponding to the sheet discrimination sensors P1 to P6, the plungers of the sensors are not depressed, leaving the corresponding micro-switches in the OFF state, which generates an OFF signal.

On the other hand, in the case where the sheet discrimination part 60 does not have sensor holes 60A through 60F at the positions corresponding to the sheet discrimination sensors P1 to P6, the plungers of the sensors are depressed, bringing the corresponding micro-switches into an ON state, which generates an ON signal. Accordingly, the respective sheet discrimination sensors P1 through P6 output 6-bit signals made up of [0] and [1]. Thus, if the sheet discrimination sensors P1 through P6 are all in an OFF state, specifically, if the rolled sheet holder 12 is not loaded, a 6-bit signal [000000] is output.

An engaging shaft 33 is erected in an inner side of the top cover 14, at the periphery of the opening for the cover, facing the side edge part opposite the holder support member 23 of the holder housing part 4. The engaging shaft 33 has a circular shape in cross section and its height is substantially equal to the thickness of the link lever 34. This engaging shaft 33 is fitted in a through hole formed in one edge part of the link lever 34 for operating the vertical movement of the thermal head 32 (refer to FIG. 3) so as to allow the edge part of this link lever 34 to freely rotate and detach with respect to the engaging shaft 33.

As shown in FIG. 3, a roller shaft 35A of the platen roller 35 is supported, in a freely rotatable manner, at a back side of the insertion opening 26 in a conveying direction of the rolled sheet. The thermal head 32 is fixed on an upper surface of a head support member 37 which is biased upward by a pressure sensitive spring 36. The rear edge part of the head support member 37, with respect to a conveying direction, is supported on a rear side of a frame 38 so as to allow swinging thereof in a vertical direction.

When the top cover 14 is turned backward for opening, the link lever 34 moves backward in cooperation with the movement of the top cover 14, causing the thermal head support member 37 to move downward, and separating the thermal head 32 from the platen roller 35 arranged opposite therefrom. The rolled sheet 12A is then fed from the insertion opening 26, allowing insertion of the rolled sheet 12A between the platen roller 35 and the thermal head 32.

When closing the top cover 14, the link lever 34 is moved forward in cooperation with the movement of the top cover 14, causing the thermal head support member 37 to move upward. The thermal head 32 then forces the rolled sheet 12 against the platen roller 35 by means of the pressure sensitive spring 36, whereby a printable state is obtained.

Further, below the rolled sheet holder housing section 13, there is provided, through a dividing wall 39, a control board 40 on which a control circuit is formed to drivingly control mechanisms such as the thermal head 32, etc. in response to commands from a computer device 2 or the like.

A schematic configuration of the rolled sheet holder 12 will next be described based on FIG. 6.

Figure 6:
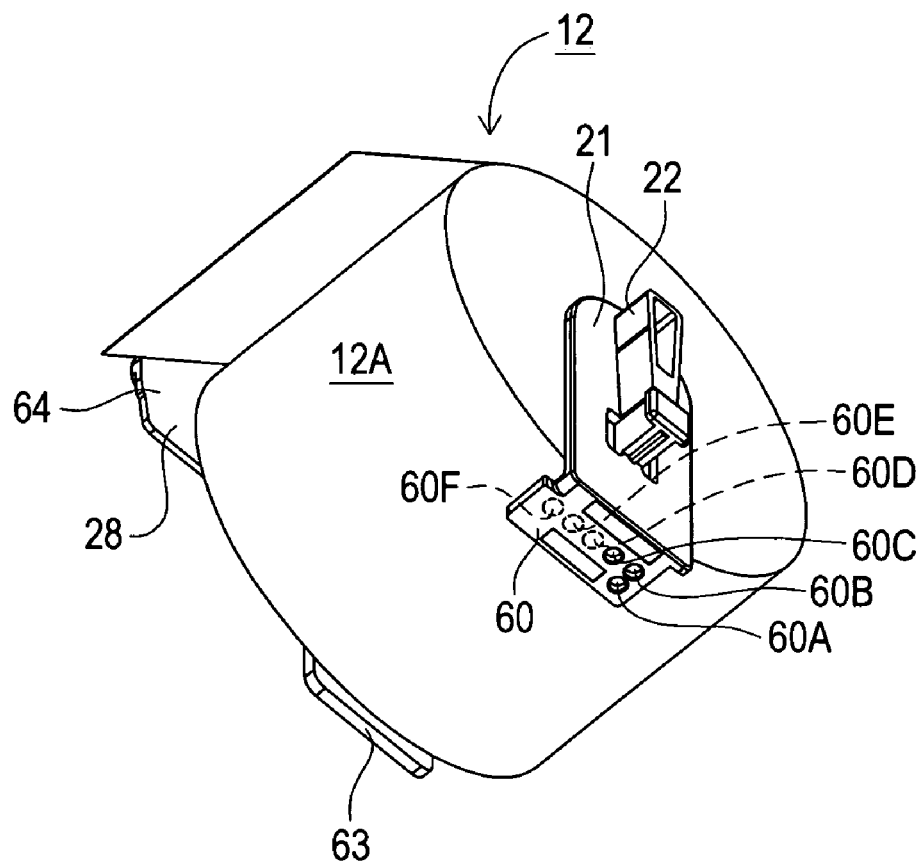
FIG. 6 is a perspective view taken from a lower side and shows one example of a rolled sheet holder having a rolled sheet loaded therein.

As shown in FIG. 6, the rolled sheet holder 12 which has the rolled sheet 12A wound on a sheet core loaded therein in a rotatable manner, has the following configuration.

The guide member 28 constituting the rolled sheet holder 12 is formed with a first extended portion 63 which extends downward and is fitted in the positioning recess part 13A formed in the bottom part of the rolled sheet holder housing section 13 so as to be brought in contact with the bottom surface of the positioning recess part 13A. The guide member 28 is also formed with a second extended portion 64 which has an upper edge part thereof sloped downward to the front side of the loading part 29, so as to cover a substantially front quarter round of the outer end face of the rolled sheet 12A.

The second extended portion 64 has a lower end part which extends substantially horizontally, and a tip lower end part which is inserted in any of the second positioning groove parts 30A to 30E facing the sheet width of the rolled sheet 3A thus loaded. The second extended portion 64 is formed so that one side edge of the rolled sheet 12A thus loaded is guided along the inner surface of the second extended portion 64 up to the insertion opening 26 (refer to FIG. 2).

A holder shaft member 62 erected on an inner surface of the guide member 28 and an inner surface of the holding member 21 serves to rotatably support the sheet core onto which the rolled sheet 12A is wound. The holder shaft member 62 may be selected from amongst a plurality of types of shafts (five shafts including 12 mm, 17 mm, 29 mm, 38 mm and 62 mm in the present embodiment) of different lengths individually corresponding to the lengths of the sheet core for the rolled sheet 12A.

A mounting member 22 of the holding member 21 is formed so as to become narrower in a downward direction in a front view (bottom in FIG. 6) and to be fitted in the first positioning groove part 24 having a narrower width towards the bottom of the holder support member 23 in the tape printer 3. The mounting member 22 is formed so that the protruding height thereof becomes almost equal to the width of the first positioning groove part 24. Accordingly, to mount the rolled sheet holder 12, the mounting member 22 is inserted into the first positioning groove part 24. Thus, the rolled sheet holder 12 can be fitted in place.

The holding member 21 is designed to have its lower edge part of the guide member 28 extending downward longer by a predetermined length (about 1.0 mm to 2.5 mm in this embodiment) than the lower edge part of the guide member 28. The holding member 21 is also provided, at the lower edge part thereof, with a sheet discrimination part 60 of a substantially rectangular shape extending inward by a predetermined length at substantially right angle therewith. As mentioned earlier, the sheet discrimination part 60 is formed with the sensor holes 60A to 60F arranged at predetermined positions corresponding to the sheet discrimination sensors P1 through P6 respectively, in an L-shaped pattern. FIG. 6 shows that the sensor holes 60A through 60C from amongst sensor holes 60A through 60F have been formed in the sheet discrimination part 60.

Here, out of the 6 sensor holes 60A through 60F, maximum 5 sensor holes are formed in the sheet discrimination part 60. Specifically, the presence and absence of the respective sensor holes 60A through 60F are allocated "1" and "0" respectively so that the type, material and width of the rolled sheet 12A held in the rolled sheet holder 12 can be represented by 6-bit codes such as [000001] through [111111]. A 6-bit code such as [000000] shows that the rolled sheet holder 12 is not loaded.

Next, the circuit configuration of the computer device 2 constituting the label printing system 1 will now be described based on FIG. 7.

Figure 7:
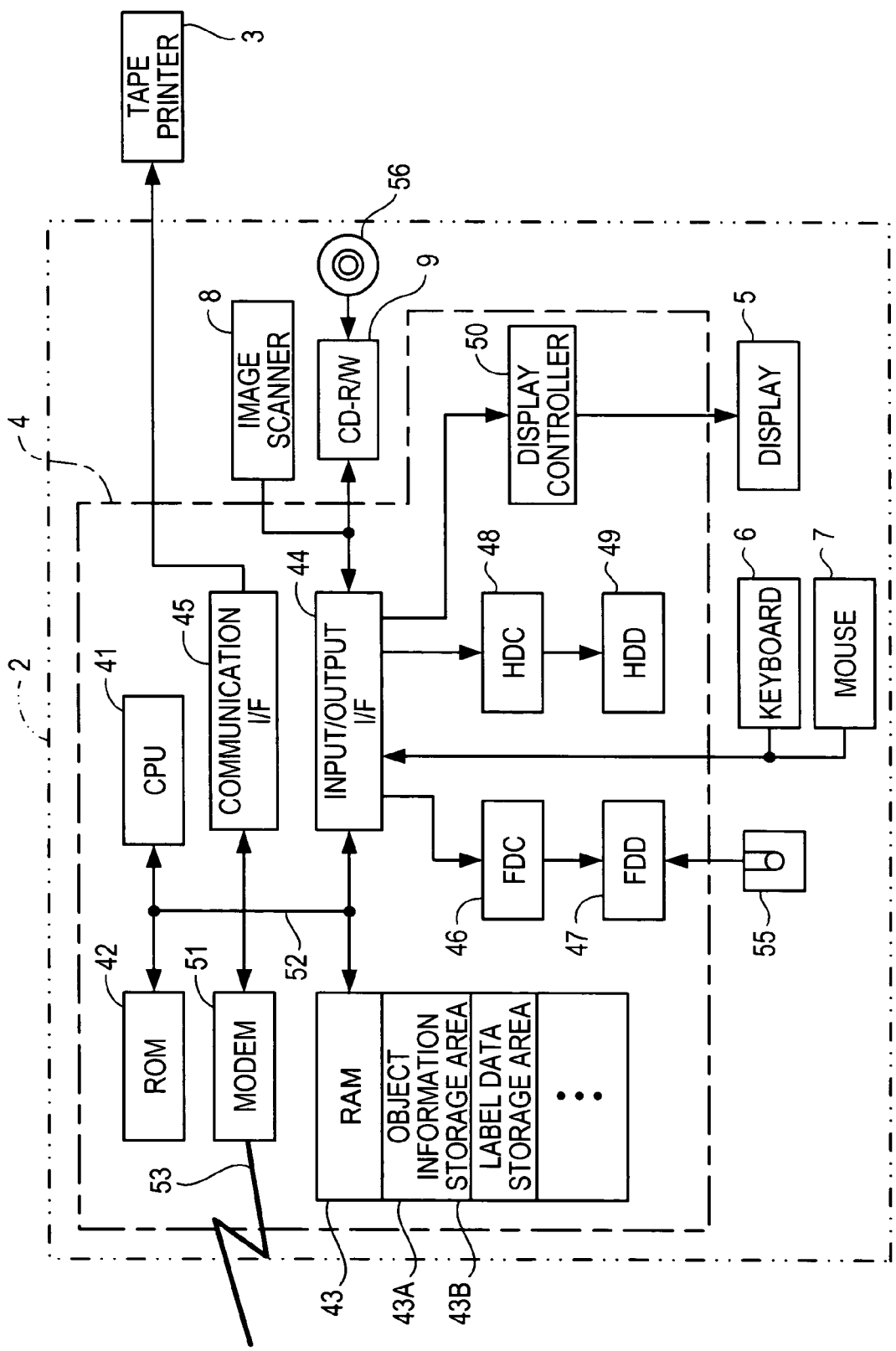
FIG. 7 is a circuit block diagram that shows a circuit configuration of a main section in the computer device as shown in FIG. 1.

As shown in FIG. 7, the host controller 4 of the computer device 2 has a CPU 41, a ROM 42, a RAM 43, an input/output interface (I/F) 44, a communication interface (I/F) 45, a Floppy™ disc controller (FDC) 46, a Floppy™ disc drive (FDD) 47, a hard disc controller (HDC) 48, a hard disc drive (HDD) 49, a display controller 50, a modem 51, and the like. The CPU 41, the ROM 42, the RAM 43, the input/output interface (I/F) 44, the communication interface (I/F) 45, and the modem 51 are interconnected through a bus line 52, whereby exchange of data is performed. To the input/output I/F 44, the FDD 47 and the HDD 49 are connected through the FDC 46 that drivingly controls the FDD 47, and the HDC 48 that drivingly controls the HDD 49, respectively. The display controller 50 is also connected to the input/output I/F 44. A telephone line 53 is connected to a modem 51.

The keyboard 6, the mouse 7, the image scanner 8 and the CD-R/W drive 9 are connected to the host controller 4. The keyboard 6 is used for entering characters and symbols through the input/output I/F 44. The mouse 7 is used for entering the coordinates on the display screen of the display device 5. The image scanner 8 is used for capturing visible outline data and the like from drawings. The CD-R/W drive 9 is used for writing into and reading from a CD-ROM 56, print data and various kinds of application software such as layout editing software and the like for displaying a layout editing window 89 (refer to FIG. 12), as will be described later. Also, the display device 5 is connected to the host controller 4 through the display controller 50. The display device 5 displays the layout editing window 89 as will be described later, and the layout and the like of a non-fixed length rolled sheet 12A. Further, the tape printer 3 is connected to the host controller 4, through the communication I/F 45 and the signal cable K1.

The CPU 41 controls the entire label printing system 1, and manages all data concerning the operation of the label printing system 1. The ROM 42 stores a startup program for booting the computer device 2 at power-on to start up the CPU 41, which is in common with general personal computers.

The RAM 43 temporarily stores different types of data when the CPU 41 performs various kinds of control. The RAM 43 has an object information storage area 43A and a label data storage area 43B. The object information storage area 43A stores object information such as image data or the like. The label data storage area 43B stores template data transmitted to the tape printer 3 and label data including character string data, drawing pattern data and the like entered through the keyboard 6.

The communication I/F 45 is composed of, for instance, a Centronics interface and USB (Universal Serial Bus), which allows interactive data communications with the tape printer 3 and an external electronic device (such as a computer or a laser printer).

The hard disc mounted on the HDD 49 stores an operating system (OS) of various kinds such as MS-DOS™ and Windows™. In addition, the hard disc also stores communication protocols for data communications with the tape printer 3 and the external electronic device, application software of various kinds, such as word processing software executable in the browser and the OS and a layout editing software for creating the label data for printing, as required.

A Floppy™ disc (FD) 55 which is easy to be inserted in or removed from the FDD 47 stores a variety of print data.

An optical disc (CD-ROM) 56 which is easy to be inserted in or removed from the CD-R/W drive 9 stores control programs of the control process such as the layout editing window for editing text and objects by inserting and displaying such in a print area to be described later, and object information included in objects of various formats, such as GIF, JPEG, BMP or the like (for instance, object name, length dimension of the original image for the object, width dimension of the original image for the object, image data and the like). This information is then supplied to the respective label creating apparatuses.

Next, the circuit configuration of the tape printer 3 constituting the label printing system 1 will be described based on FIG. 8 through FIG. 10.

Figure 8:
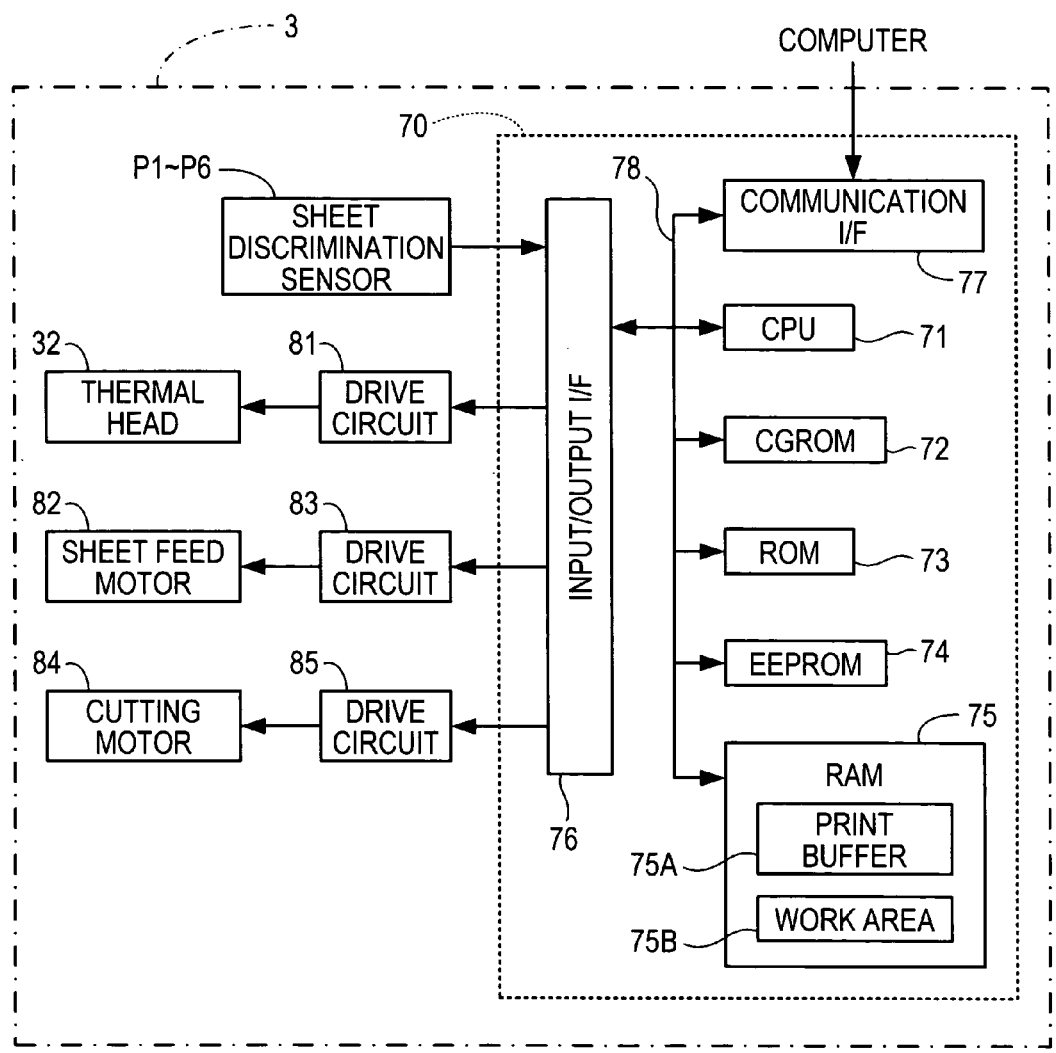
FIG. 8 is a circuit block diagram that shows a circuit configuration of a main section in the tape printer as shown in FIG. 1.

As shown in FIG. 8, a control circuit 70 formed on the control board 40 of the tape printer 3 has a CPU 71, a CG (character generator) ROM 72, a ROM 73, a flash memory (EEPROM) 74, a RAM 75, an input/output interface ("I/F") 76, a communication interface (I/F) 77 and the like. The CPU 71, CGROM 72, ROM 73, flash memory 74, RAM 75, input/output interface ("I/F") 76 and the communication interface (I/F) 77 are interconnected through a bus line 78, whereby exchange of data is performed.

The CGROM 72 stores dot pattern data corresponding to individual characters. The dot pattern data is read out from the CGROM 72 and a dot pattern is printed on the thermal sheet of the rolled sheet 12A based on that dot pattern data.

The ROM 73 stores various types of programs, such as a label creating process program of the non-fixed length rolled sheet 12A, required to control the tape printer 3. The ROM 73 stores a sheet type table 731 (refer to FIG. 9) including the types of rolled sheet 12A with respect to the respective 6-bit codes inputted from the sheet discrimination sensors P1 through P6, and the material, etc. of the thermal sheet of the rolled sheet 12A corresponding to the respective 6-bit codes that were inputted from the sheet discrimination sensors P1 through P6. The ROM 73 stores a die cut type table 732 (refer to FIG. 10) including the dimensions of the die cut label for each die cut.

Here, one example of the sheet type table 731 which stores the various types of rolled sheet 12A corresponding to the individual 6-bit codes inputted from the sheet discrimination sensors P1 through P6 will now be described based on FIG. 9.

As shown in FIG. 9, the sheet type table 731 is composed of a [sheet discrimination sensor] column showing the 6-bit codes inputted from the respective sheet discrimination sensors P1 through P6, and a [rolled sheet type] column showing the type of the rolled sheet 12A corresponding to the respective 6-bit codes.

For instance, item [12 mm non-fixed length] in the [rolled sheet type] column corresponds to the case that the [sheet discrimination sensor] is [110100], and shows a rolled sheet 12A having 12 mm width and non-fixed length. Also, item [12 mm die cut 1] in the [rolled sheet type] column corresponds to the case that the [sheet discrimination sensor] is [111001] and shows a die cut wherein the thermal sheet of a 12 mm-wide non-fixed length rolled sheet 12A is half cut by a fixed pitch in a predetermined shape.

Here, one example of the die cut type table 732 wherein the dimensions of the die cut label for each individual cut are stored, will now be described based on FIG. 10.

As shown in FIG. 10, the die cut type table 732 is composed of a [die cut type] column that shows the type of the die cut and a [width×length] column showing the dimensions of the die cut labels that were half-cut. For instance, item [12 mm×54 mm] in the [width×length] column corresponds to the case that the [die cut type] is [12 mm die cut 1]. Specifically, the [12 mm die cut 1] shows that the thermal sheet of the 12 mm-wide non-fixed length rolled sheet 12A is half-cut in advance by a fixed pitch into die cut labels of [12 mm×54 mm].

The CPU 71 serves to execute various operations in accordance with the various programs stored in the ROM 73. The ROM 73 stores outline data related to individual large numbers of characters for defining outlines of the characters. The characters of the outline data are classified in units of a typeface (Gothic typeface, Mincho typeface, or the like), in correlation to code data. The dot pattern data is extracted to a print buffer 75A in accordance with the outline data.

The flash memory 74 serves to store dot pattern data such as extended character data received from an external computer device 2, etc. and dot pattern data such as various types of drawing pattern data, which have been allocated registration numbers. The flash memory 74 retains the stored contents even when the power of the tape printer 3 is OFF.

The RAM 75 temporarily stores results of various operations performed by the CPU 71. In the RAM 75 are provided various types of memories such as a print buffer 75A and a work area 75B or the like. The print buffer 75A stores print dot patterns such as a plurality of characters and symbols and number of applied pulses representing the energy amount for creating the dots, as dot pattern data. The thermal head 32 carries out dot printing in accordance with dot pattern data stored in the print buffer 75A.

The input/output I/F 76 is connected to the sheet discrimination sensors P1 through P6, a drive circuit 81, a drive circuit 83 and a drive circuit 85, etc., respectively. The drive circuit 81 is used for driving the thermal head 32. The drive circuit 83 is used for driving the sheet feed motor 82 which causes the platen roller to rotate. The drive circuit 85 is used for driving the cutting motor 84 that operates the vertical movement of the movable blade 17B.

The communication I/F 77 is connected to the USB connector 20, and to an external computer device 2 through a signal cable K1, allowing interactive data communications therewith. Accordingly, in case of a request for transmission of information with respect to the rolled sheet 12A loaded in the tape printer 3, from the CPU 41 of the computer device 2, the CPU 71 reads out information with respect to the rolled sheet 12A loaded in the tape printer 3 from the sheet type table 731 or the die cut type table 732, based on the output signal from the respective sheet discrimination sensors P1 through P6. The CPU 71 then transmits this information to the computer device 2. The CPU 71 creates the label sheet based on the print instruction command and print data that were transmitted from the CPU 41 of the computer device 2.

Next, a link object creating and update process for creating and updating link objects composed of a plurality of objects which will be printed on the rolled sheet 12A, which is executed by the CPU 41 of the computer device 2 in the label printing system 1 having the above configuration will be described based on FIG. 11 through FIG. 23.

Figure 11:
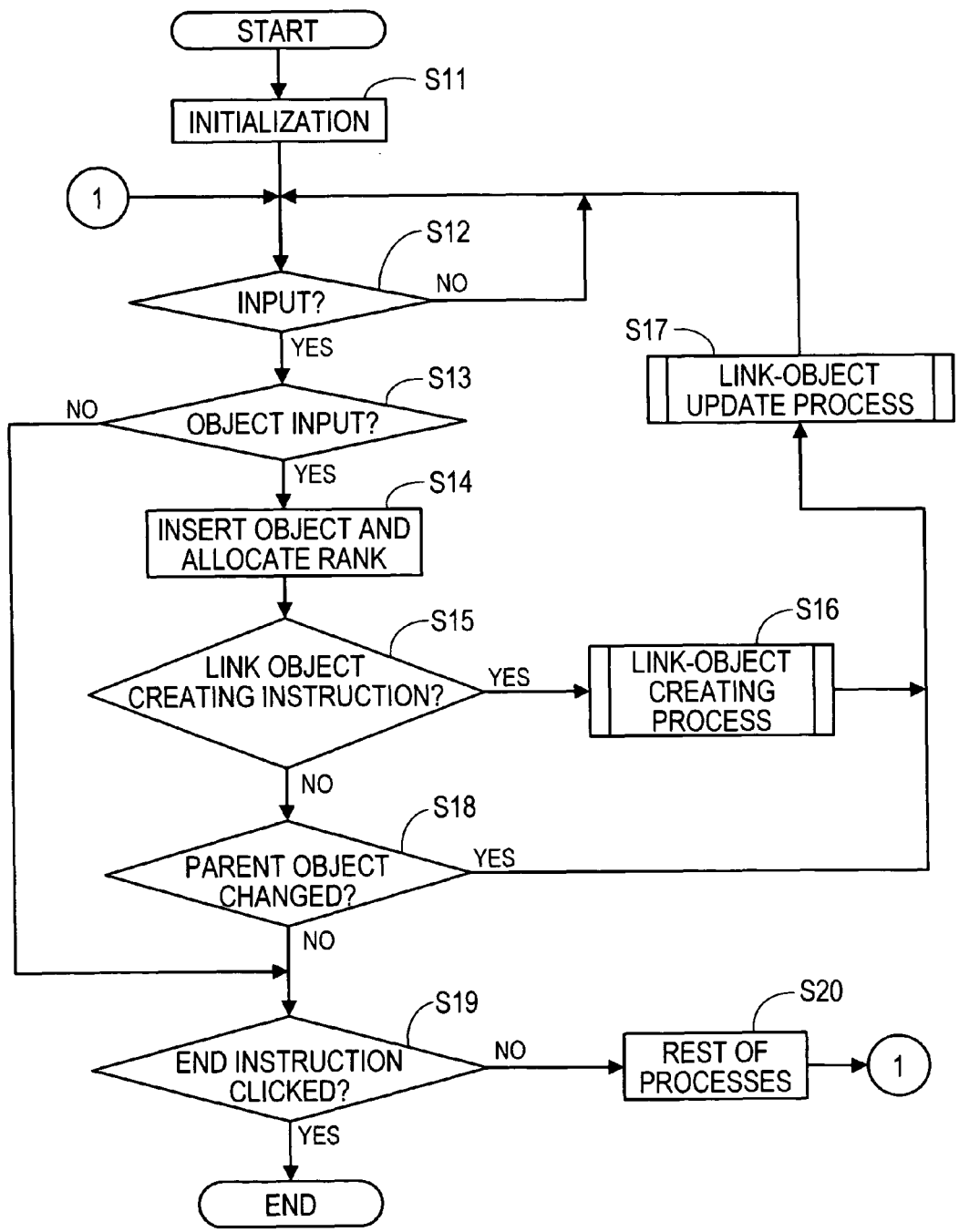
FIG. 11 is a main flow chart showing a link object creating and update process for creating and updating a link object made up of a plurality of objects to be printed on the rolled sheet by a CPU in the computer device as shown in FIG. 1.

As shown in FIG. 11, at step (hereinafter referred to as "S") 11, the CPU 41 of the computer device 2 first carries out an initialization process of the entire host controller 4 in the computer device 2. More specifically, the CPU 41 checks and initializes the operation of the RAM 43, the input/output interface 44 and the communication interface 45. The CPU 41 further performs initialization of the display device 5 which is connected to the input/output interface 44. Then, in case of no anomalies, the CPU 41 initializes the data stored in the RAM 43 and the functions of the respective parts.

Once these initialization processes are finished, if a layout editing software for creating label data to be printed on the non-fixed length rolled sheet 12A is activated, the CPU 41 obtains information with respect to the rolled sheet 12A, such as the type (whether the sheet is non-fixed length rolled sheet, die cut, etc.), sheet width and dimensions of the die cut label with respect to the rolled sheet 12A loaded in the tape printer 3, from the CPU 71 of the tape printer 3, through the communication interface 45. Next, the CPU 41 displays a layout editing window 89 (refer to FIG. 14), as will be described later, in a display screen of the display device 5, based on information with respect to the rolled sheet 12A obtained from the tape printer 3.

Next, at S12, the CPU 41 awaits a key input from the keyboard 6 or a click input such as from a menu button using the mouse 7 (S12: NO).

In case of a key input from the keyboard 6 or a click input such as from a menu button or the like by mouse 7 (S12: YES), the CPU 41 shifts the flow to processing S13. At step S13, the CPU 41 executes a judgment process for judging whether or not an object including text or graphic symbol, etc. has been entered from the keyboard 6. If no object such as text or graphic symbol, etc. has been entered from the keyboard 6 (S13: NO), the CPU 41 shifts the flow to process S19 as will be described later.

On the other hand, if an object such as text or graphic symbol has been inputted from the keyboard 6 (S13: YES), the main CPU 41 shifts the flow to process S14. At S14, the CPU 41 inserts the object that was entered on a rectangular layout 91 (refer to FIG. 14) representing a non-fixed length rolled sheet 12A displayed on the layout editing window 89, and at the same time, allocates a rank to each object in the order they were entered, after which the flow shifts to process S15.

Here, an example for entering an object such as text or a graphic symbol or the like from the keyboard 6 will be described based on FIG. 14 and FIG. 15. If the layout editing software has been activated, a print mode of the non-fixed length rolled sheet 12A is set to a free length print mode, and the text to be printed is set to horizontal writing.

Figure 14:
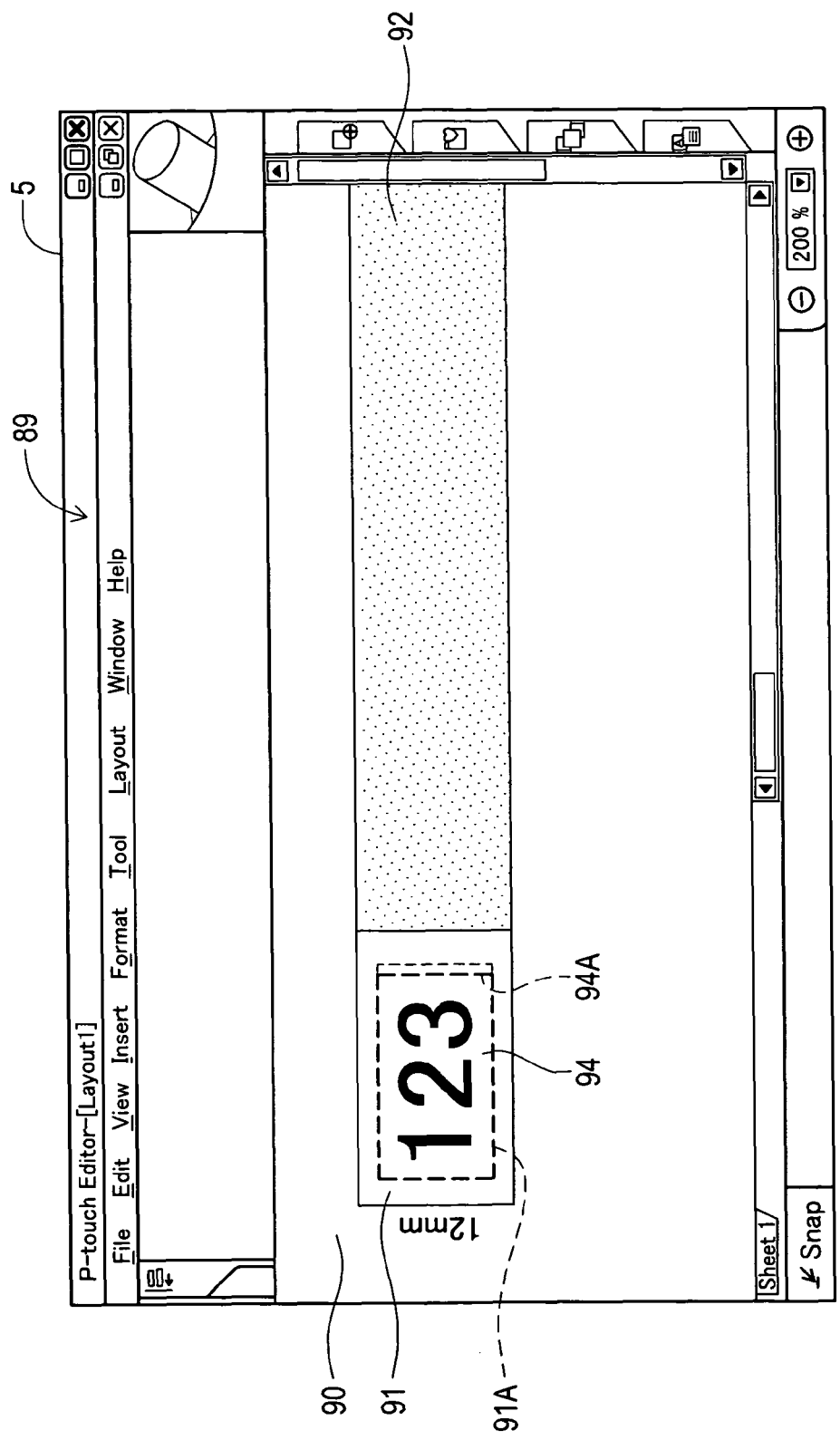
FIG. 14 is a view showing one example wherein one object is inputted to the layout.

As shown in FIG. 14, the CPU 41 displays, on the display device 5, the layout editing window 89 having a layout display window 90 formed therein. Because the text to be printed is horizontal writing, the CPU 41 causes the following display. Specifically, if a non-fixed length rolled sheet 12A being 12 mm wide is loaded in the tape printer 3, the CPU 41 displays, on the layout display window 90, the rectangular layout 91 which is 12 mm wide and has a predetermined length in a conveying direction (in the present embodiment, approximately, 25 mm) representing the non-fixed length rolled sheet 12A, so that the conveying direction of the layout 91 follows a left-to-right direction on the layout display window 90. The rectangular print area 91A inside the layout 91 is displayed by a fine broken line.

Because the text to be printed is horizontal writing and at the same time, the non-fixed length rolled sheet 12A is loaded, the CPU 41 displays a semi-transparent outline 92 which is rectangular and long sideways, being 12 mm wide. The outline 92 is displayed extending from a right edge part (rear side in a conveying direction) of the layout 91 up to the side edge part of the layout display window 90. The outline 92 can be displayed up to a length corresponding to a maximum free length which can be set in the free length print mode. The CPU 41 displays a character string [12 mm] long showing the sheet width at the exterior of the left edge part (tip edge part in a conveying direction) of the layout 91, in parallel with the left edge part layout 91, indicating the conveying direction.

The following happens in the free length print mode. If the print area 91A is clicked with the mouse 7, after which [1], [2] and [3] are entered from the keyboard 6 and the return key is pressed, the CPU 41 displays object 94 such as text [123], which is entered to the print area 91A and has a maximum font size, with a thick broken line 94A drawn around it, and at the same time, scales down this layout 91 to a three-character length in a horizontal direction. Simultaneously, the CPU 41 displays the outline 92 in an extended manner so that the left end part thereof comes in contact with the layout 91. The CPU 41 sets the rank of the object 94 on the layout 91 to first, and then stores this information in the RAM 43.

Figure 15:
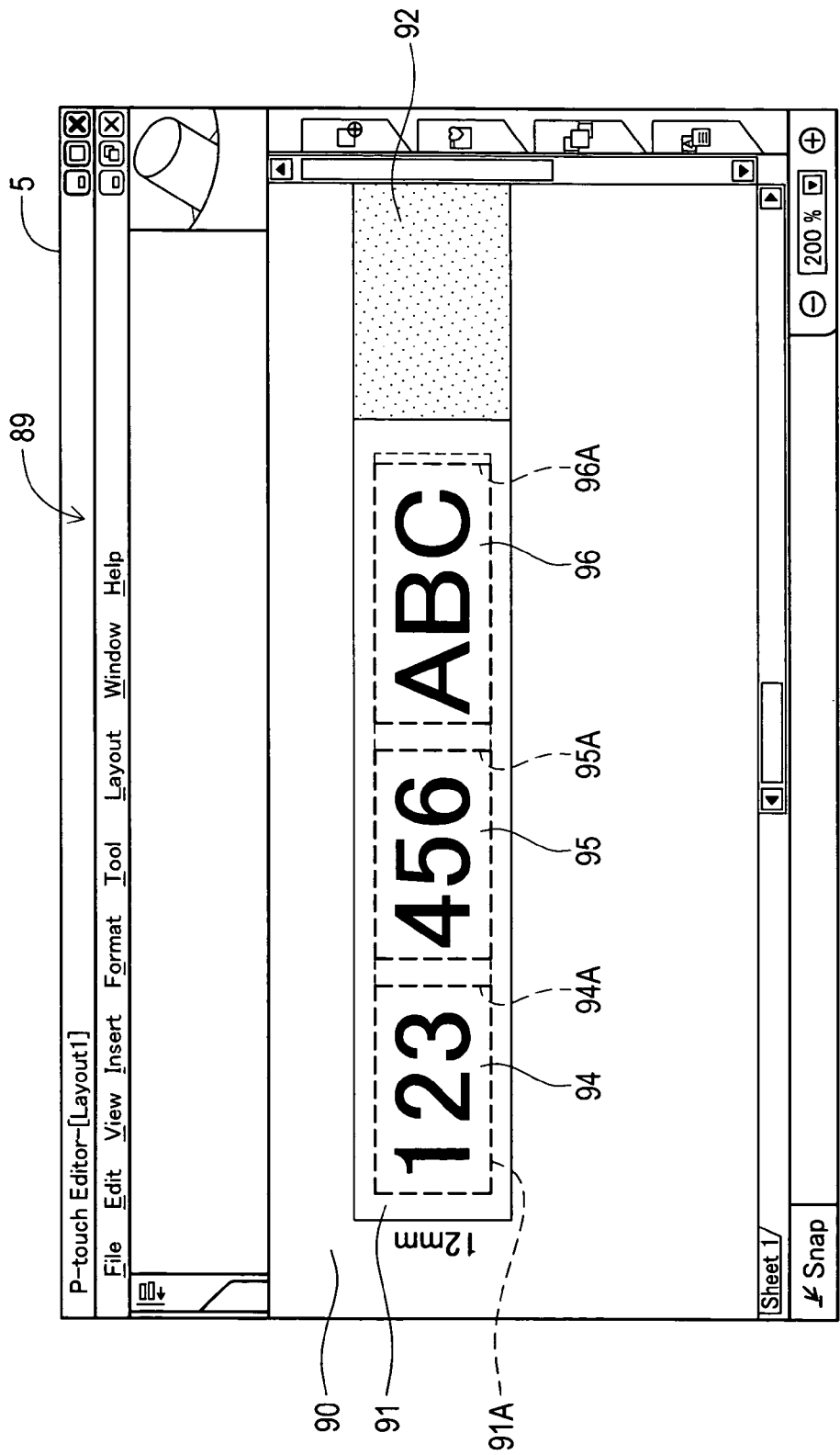
FIG. 15 is a view showing one example wherein a plurality of objects have been inputted to the layout.

As shown in FIG. 15, if [4], [5] and [6] are entered from the keyboard 6 in the state shown in FIG. 14, after which the return key is pressed, and further, [A], [B] and [C] are entered from the keyboard 6 after which the return key is pressed, first, object 95 including text [456] is displayed at the maximum font size allowable the print area 91A, a thick broken line 95A drawn around it, slightly spaced away from the object 94.

Then, object 96 including text [ABC] is further displayed at the maximum font size allowed for the print area 91A, with a thick line 96A drawn around it, slightly spaced away from the object 95. At the same time, the layout 91 is expanded in a horizontal direction so that the respective objects 94, 95 and 96 can be accommodated in the print area 91A. Also, at the same time, the outline 92 is displayed in a smaller size so that the left end part thereof is connected to the layout 91. The CPU 41 sets the respective ranks of the individual objects 95 and 96 on the layout 91 to second and third, respectively, and stores the objects in the RAM 43.

Next, as shown in FIG. 11, at S15, the CPU 41 executes a judgment process for judging whether or not a link object creating instruction has been entered to create the link object.

Here, the link object creating instruction may include the case of selecting a plurality of objects such as text, word art or bar code and entering a command from the menu window to create link objects therefrom, as will be described later. It may also include the case of selecting one object such as text, word art or bar code, and entering a command from the menu window to create a child object therefrom including text, word art or bar code and creating a link object (refer to FIG. 12).

If a link object creating instruction is entered (S15: YES), the CPU 41 shifts the flow to process S16. At step S16, the CPU 41 executes a sub-process such as [link object creating process] (refer to FIG. 12), after which the flow proceeds to process S17. At step S17, the CPU 41 executes a sub-process such as the [link object update process] (refer to FIG. 13), as will be described later. Then, the CPU 41 re-executes the processes following S12.

Alternatively, if the link object creating instruction has not been entered (S15: NO), the CPU 41 shifts the flow to process S18. At S18, the CPU 41 executes a judgment process for judging whether or not the parent object constituting the link object is changed.

If the parent object of the link object is changed (S18: YES), the CPU 41 shifts the flow to process S17.

Alternatively, if the parent object of the link object is not changed (S18: NO), the CPU 41 shifts the flow to process S19. At S19, the CPU 41 executes a judgment process for judging whether or not the end menu or the end button of the layout editing software was clicked with mouse 7. If the end menu or the end button of the layout editing software is clicked with mouse 7 (S19: YES), the CPU 41 deletes the layout editing window 89 from the display screen of the display device 5, and ends the processing.

Alternatively, if the end menu or the end button of the layout editing software is not clicked with mouse 7 (S19: NO), the CPU 41 shifts the flow to process S20. At step S20, the CPU 41 executes the rest of the processes. The rest of the processes include displaying a print menu window in response to a call command for the print menu window, and outputting label data with respect to the tape printer 3 in response to a click on the print menu using the mouse 7. Once these processes have ended, the CPU 41 executes the processes subsequent to S12.

Next, a sub-process such as [link object creating process] executed at S16 will now be described based on FIG. 12.

Figure 12:
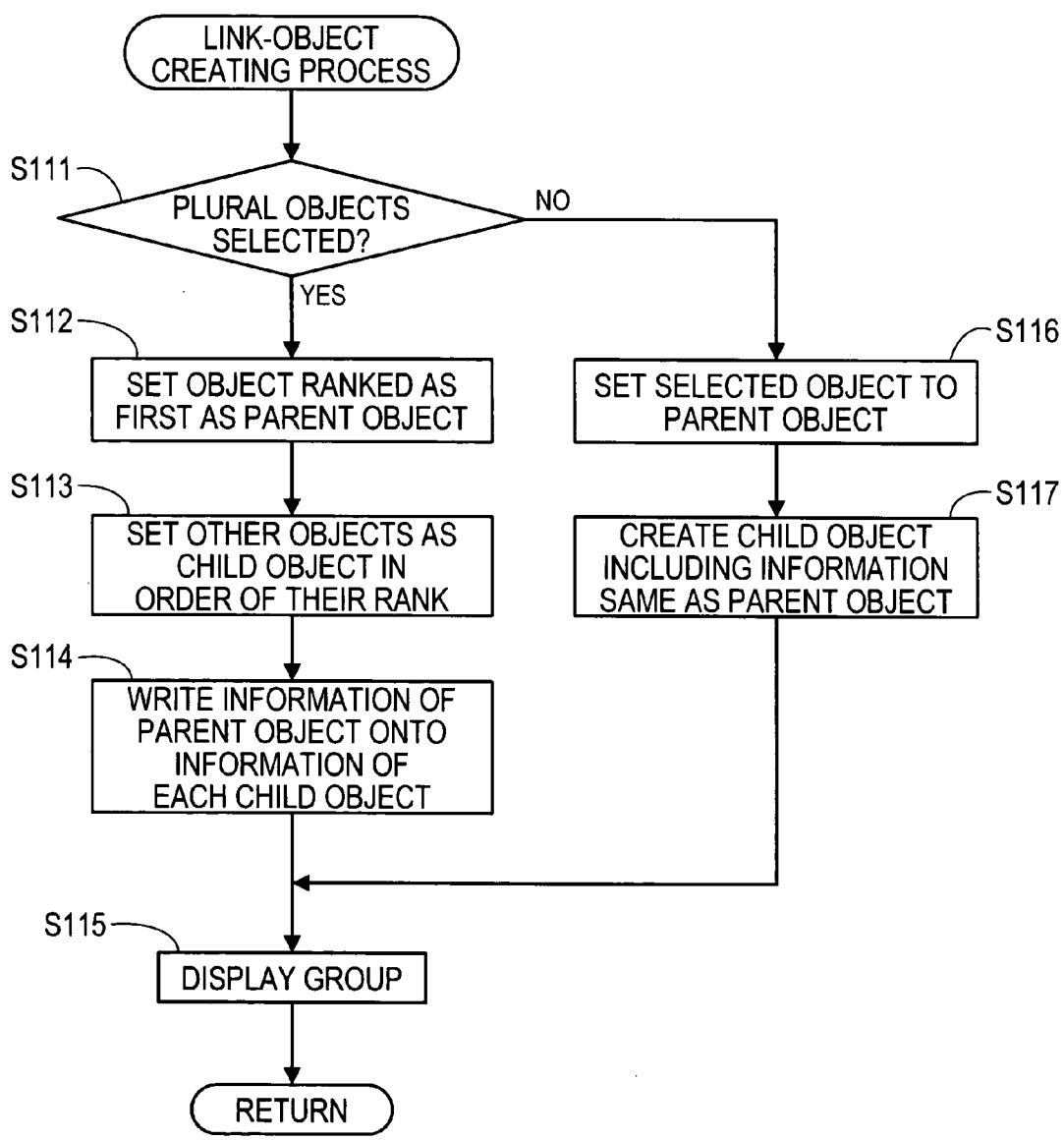
FIG. 12 is a sub-flow chart showing sub-processes of the [link object creating process] as shown in FIG. 11.

As shown in FIG. 12, at S111, the CPU 41 first executes a judgment process for judging whether or not the plurality of objects including text, word art or bar code arranged on the layout 91 are selected and a command was entered from the menu window to create link objects therefrom.

If the plurality of objects including text, word art or bar code and arranged on the layout 91 are selected and a command is entered from the menu window to create link objects (S111: YES), the CPU 41 shifts the flow to process S112. At S112, the CPU 41 reads out the rank of each of the plurality of objects thus selected from the RAM 43 and sets the object ranked as first as a parent object constituting the link object. Then, a group ID for identifying the link object is allocated to the parent object, which is thereafter stored in the RAM 43. The group ID [1] is allocated to the parent object which was ranked as first. With respect to the setting of subsequent parent objects, the parent objects are sequentially allocated to a group ID obtained by adding [1] to the group ID which was allocated to the preceding parent object.

Then, at step S113, the CPU 41 reads out, from the RAM 43, the rank of the remaining objects, other than the parent object, from amongst the plurality of objects thus selected and sets them as child objects in the order of their rank. At the same time, a group ID which is the same as that of the parent object is allocated to each child object. Then, these child objects are stored in the RAM 43 as child objects constituting the link object. Accordingly, the parent object and each child object are allocated the same group ID for grouping.

Next, at S114, the CPU 41 reads out the parent object and group ID allocated to the parent object from the RAM 43, and writes information included in the parent object onto information included in each child object to which this group ID was allocated. Specifically, the information included in each child object is updated to the information included in the parent object and is then stored in the RAM 43. Consequently, information in each child object constituting the link object represents information which is the same as that in the parent object.

For instance, in a case where information included in the parent object is text [123] and information included in the child object is text [456], the information in the child object is updated to text [123], representing the same information as that in the parent object and is allocated to a group ID which is the same as that of the parent object, after which, it is stored in the RAM 43. In a case where information in the parent object is text [123] and information in the child object is bar code [456], the information in the child object is updated to the bar code [123], representing the same information as that in the parent object and is allocated to a group ID which is the same as that of the parent object, after which, it is stored in the RAM 43. In a case where information in the parent object is text [123] and information in the child object is word art [456], the information in the child object is updated to the word art [123], representing the same information as that in the parent object and is allocated to a group ID which is the same as that of the parent object, after which, it is stored in the RAM 43.

Then, at S115, the CPU 41 reads out the parent object and each child objects to which the same group IDs are allocated, from the RAM 43, and replaces each object thus selected on the layout 91 with the parent object and each child object for display. The CPU 41 allocates identification symbols showing the group ID to the parent object and each child object and displays them so as to allow identification of the parent object and each child object. For instance, the group ID allocated to the parent object is displayed as a number shown inside a circle symbol which accompanies the parent object. The group ID allocated to each child object is displayed as a number shown inside a square-shaped symbol which accompanies the child object. Then, the CPU 41 ends the sub-processes and shifts the flow to process S17 of the main flow chart.

Here, an example will be described wherein a user selects the plurality of objects arranged on the layout 91 and enters a command from the menu window to create link objects from these objects, based on FIG. 16 and FIG. 17.

Figure 16:
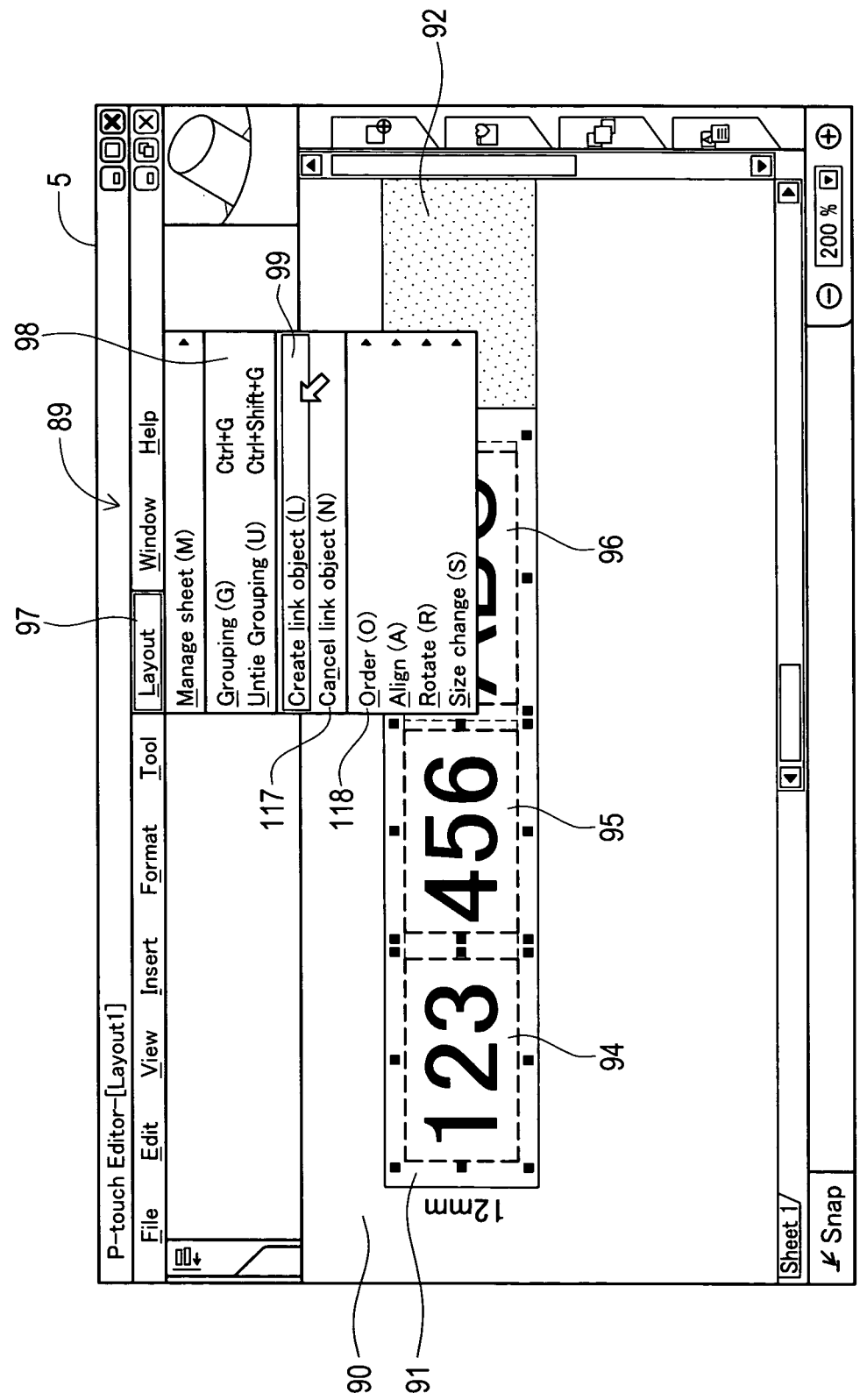
FIG. 16 is a view showing one example of selecting a plurality of objects on the layout as shown in FIG. 15 and entering a command to create link objects.

As shown in FIG. 16, the menu window 98 is displayed in a case where the user selects objects 94 through 96 in FIG. 15, and then clicks the layout button 97 with the mouse 7. Then, if the user clicks the menu item 99 [Create link object (L)] displayed on the menu window 98, with the mouse 7, the CPU 41 judges that the respective objects 94 through 96 have been selected and that a command was entered from the menu window 98 to create link objects from these objects (S111: YES).

The CPU 41 then reads out the rank of the respective objects 94 through 96 thus selected in FIG. 16 from the RAM 43, and sets the object 94 ranked as first as a parent object 101. After this, the CPU 41 allocates a group ID [1] to the parent object 101 and stores the result in the RAM 43 (S112). The respective objects 95 and 96 are set as child objects 102 and 103, respectively. After allocating a group ID [1] which is the same as that for the parent object 101, each child object is stored in RAM 43 (S113).

If the information in the parent object is text [123], the CPU 41 updates the information such as texts [456] and [ABC] in the respective child objects 102 and 103 to information such as text [123], and then stores the result in RAM 43 (S114).

Figure 17:
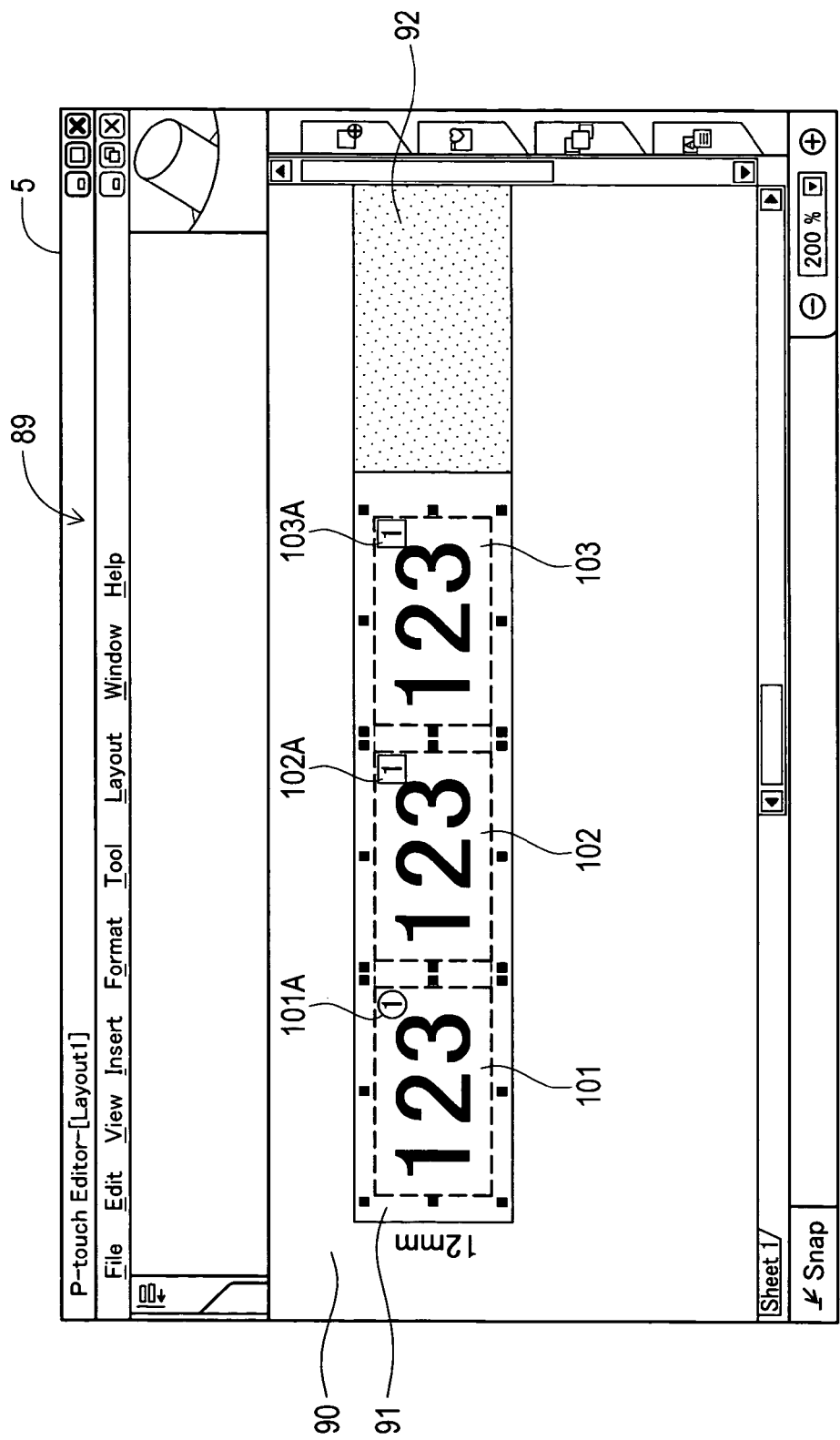
FIG. 17 is a view showing one example wherein link objects have been created from the plurality of objects as shown in FIG. 16.

Next, as shown in FIG. 17, the CPU 41 displays the parent object 101 including information such as text [123] with the identification symbol 101A attached thereto, in place of the object 94 on the layout 91. The identification symbol 101A includes a group ID shown as number [1] displayed inside a circle symbol. The CPU 41 displays the child object 102 including information such text [123] with the identification symbol 102A attached thereto, in place of the object 95 on the layout 91. The identification symbol 102A includes a group ID shown as number [1] displayed inside a square-shaped symbol.

Further, the CPU 41 displays the child object 103 including information such text [123] with the identification symbol 103A attached thereto, in place of the object 96 on the layout 91. The identification symbol 103A includes a group ID shown as number [1] displayed inside a square-shaped symbol (S115). As a result, the parent object 101 and the child objects 102 and 103 that compose the link object are grouped for display on the layout 91 as a link object. At the same time, the parent object 101 and the respective child objects 102 and 103 are displayed so as to allow identification thereof.

Alternatively, as shown in FIG. 12, at S111, if one object such as text, word art or bar code is selected on the layout 91 and a command is entered from the menu window to create a child object including text, word art or bar code, and create a link object (S111: NO), the CPU 41 shifts the flow to process S116. At S116, the CPU 41 sets the selected object to a parent object which is ranked as first in the grouped link objects and stores the parent object in the RAM 43 with a group ID attached thereto for identification.

Next, at S117, the CPU 41 creates a child object that includes information corresponding to the text, word art or bar code which is the same as that included in the parent object, in response to a command from the menu window. If a command is entered to create a child object including text, with the information in the parent object being text [123], the CPU 41 creates a child object including information such as text [123]. If a command is entered to create a child object including word art, with the information in the parent object being text [123], the CPU 41 creates a child object including information such as word art [123]. If a command is entered to create a child object including bar code, with the information in the parent object being text [123], the CPU 41 creates a child object including information such as bar code [123].

Then, the CPU 41 allocates to this child object the same group ID as that for its parent object, and stores the result in the RAM 43 as a child object with the next rank in the grouped link object, specifically, as the child object ranked as second. The CPU 41 then shifts the flow to process S115. Consequently, the parent object and the child object are grouped, with the same group ID allocated thereto.

Next, at S115, the CPU 41 reads out the parent, object and the child object that were allocated the same group ID and displays the parent object which is substituted for the object selected on the layout 91. The CPU 41 expands the layout 91 at the rear side in a conveying direction (horizontally right direction), and additionally displays the child object at the rear side in a conveying direction of the parent object. The CPU 41 then displays the outline 92 in a smaller design, so that the left tip thereof is connected to the layout 91.

The CPU 41 allocates the identification symbols showing the group ID to the parent object and the child object and displays them so as to allow identification of the parent object and the child object. For instance, the group ID for the parent object is displayed as a number shown inside a circle symbol which accompanies the parent object. The group ID for the child object is displayed as a number shown inside a square-shaped symbol which accompanies the respective child object. Then, the CPU 41 ends the sub-process and shifts the flow to process S17 of the main flow chart.

Figure 18:
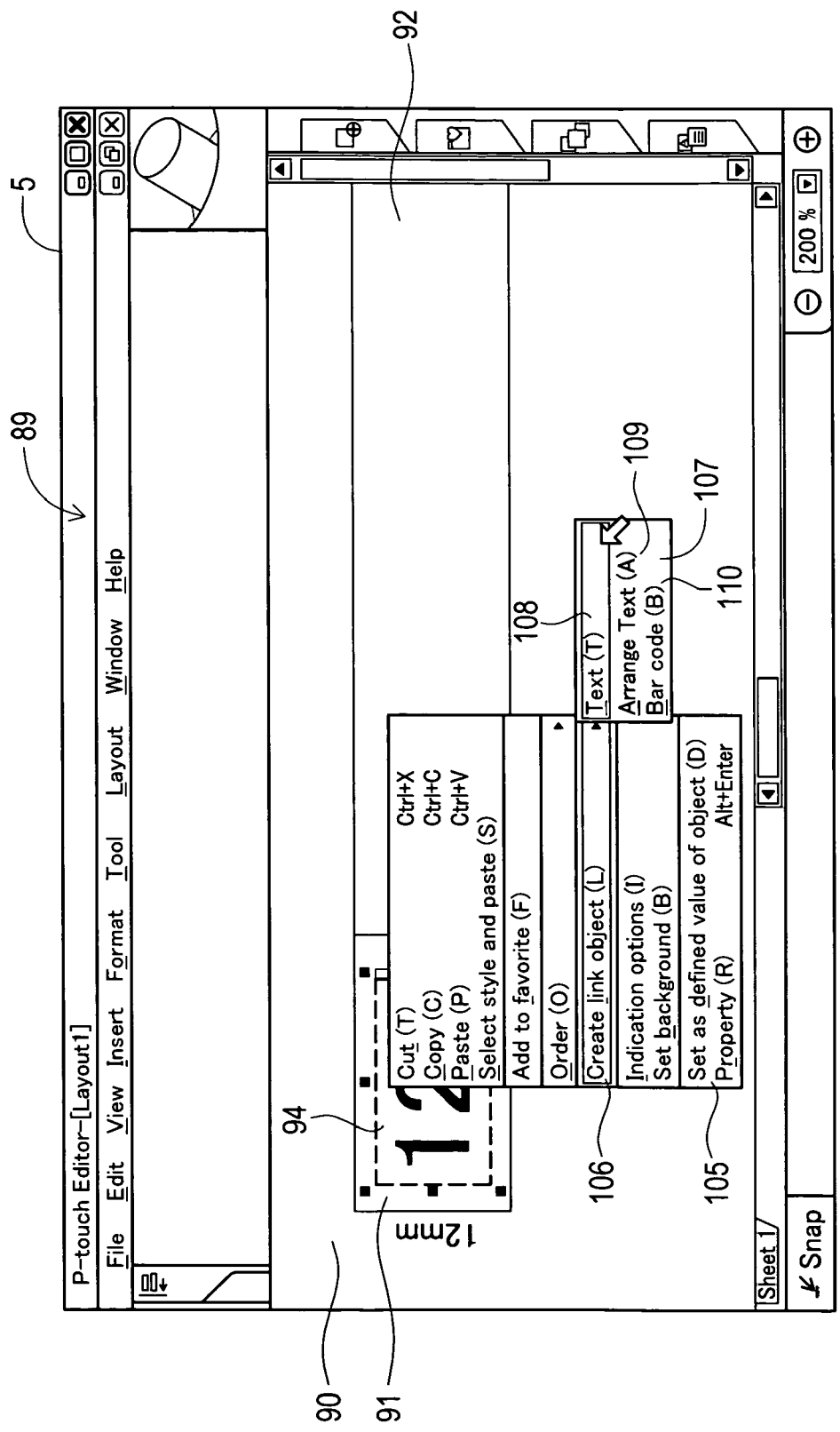
FIG. 18 is a view showing one example of selecting one object on the layout as shown in FIG. 14 and entering a command to create link objects including text.
Figure 19:
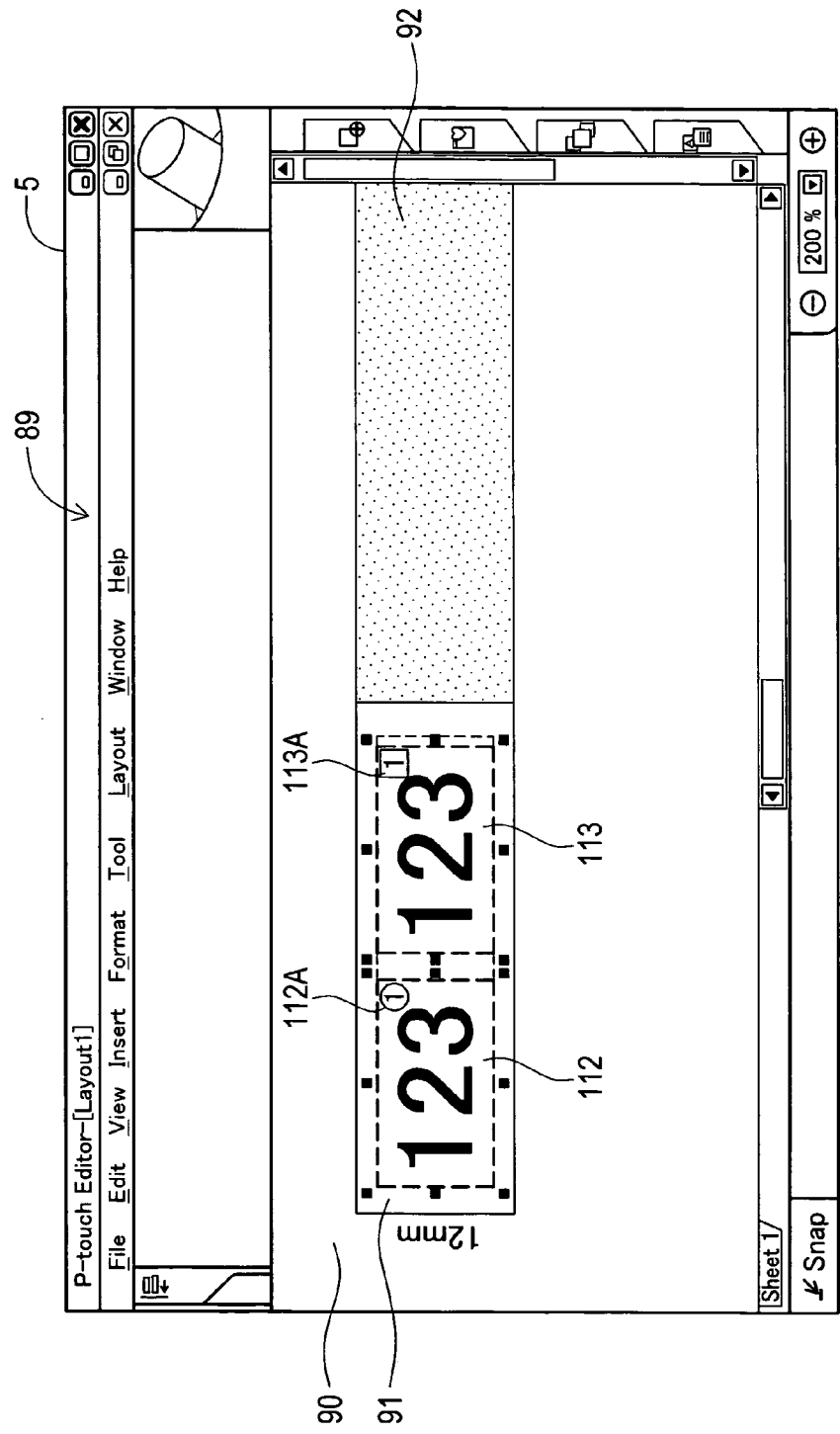
FIG. 19 is a view showing one example wherein a link object made up of a child object including text has been created from one object as shown in FIG. 18.
Figure 20:
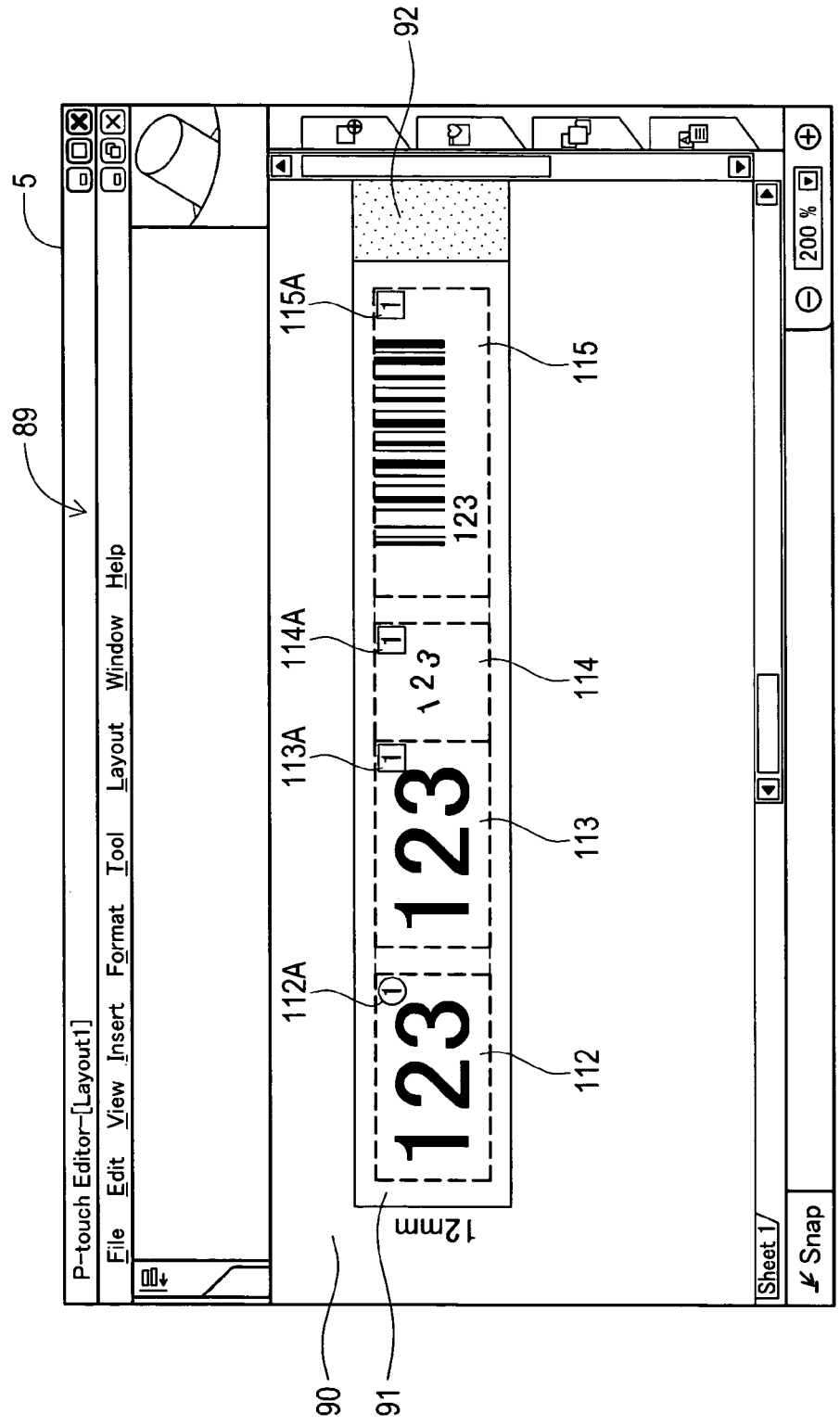
FIG. 20 is a view showing one example wherein a link object has been created from one object as shown in FIG. 14, the link object being made of a child object including text, a child object including word art and a child object including bar code.

Here, an example is described, based on FIG. 18 through FIG. 20 wherein the user selects one object including text on the layout 91 and enters a command, from the menu window, to create a child object including text, word art or bar code and turn these into link objects.

As shown in FIG. 18, the menu window 105 is displayed if the user selects the object 94 in FIG. 14 and clicks the right button of the mouse 7. Then, the select window 107 is displayed if the user clicks the menu item 106 [Create link object (L)] displayed on the menu window 105, with the mouse 7. The select window 107 displays a menu 108, a menu 109 and a menu 110. The menu 108 is used to enter a command for creating a child object including text. The menu 109 is used to enter a command for creating a child object including word art. The menu 110 is used to enter a command for creating a child object including bar code.

The, if the user clicks the menu 108 displayed on the select window 107 with mouse 7, the CPU 41 judges that the object 94 is selected as target for a parent object and at the same time, an instruction is entered to create the child object including text and create link objects that are grouped (S111: NO).

The CPU 41 then sets the object 94 selected in FIG. 18 as a parent object 112 raked as first in the grouped link objects, and allocates a group ID [1] for identifying the link object, to the parent object 112. After this, the CPU 41 stores the result in the RAM 43 (S116).

Here, the information included in the parent object is text [123], meaning that the CPU 41 creates a child object 113 including text [123]. Then, the CPU 41 allocates a group ID [1] which is the same as that for the parent object 112, to the child object 113, and then stores the result in the RAM 43 as the child object 113 ranked as second in the grouped link object (S117).

Next, as shown in FIG. 19, the CPU 41 displays the parent object 112 including information such as text [123], with the identification symbol 112A attached thereto, in place of the object 94 on the layout 91. The identification symbol 112A includes the group ID showing number [1] displayed inside a circle symbol. The CPU 41 allocates the identification symbol 113A to the child object 113 including information such as text [123]. The identification symbol 113A includes a group ID showing number [1] displayed inside a square-shaped symbol. The CPU 41 then expands the layout 91 toward a rear side in a conveying direction (horizontally right direction), and additionally displays the child object 113 toward a rear side in a conveying direction (S115). The CPU 41 then displays the outline 92 in a smaller size, so that the left tip thereof is connected to the layout 91.

If the user selects, once again the parent object 112, and clicks the right button of the mouse 7, then, with mouse 7, clicks the menu item 106 [Create link object (L)] as displayed on the menu window 105, and finally, clicks the menu item 109 as displayed on the select window 107, the CPU 41 creates the child object 114 including word art [123]. After this, the CPU 41 allocates a group ID [1] which is the same as that of the parent object 112 to the child object 114 and then stores the result as the child object 114 which is ranked as third in the grouped link object (S111: NO through S117).

Next, as shown in FIG. 20, the CPU 41 allocates an identification symbol 114A to the child object 114 including information such as word art [123]. The identification symbol 114A includes a group ID show as number [1] displayed inside a square-shaped symbol. The CPU 41 then expands the layout 91 toward a rear side in a conveying direction (horizontally right direction), and additionally displays the child object 114 at a rear side of the child object 113 in a conveying direction (S115). The CPU 41 then displays the outline 92 in a smaller size, so that the left tip thereof is connected to the layout 91.

If the user selects, once again the parent object 112, and clicks the right button of the mouse 7, then, with mouse 7, clicks the menu item 106 [Create link object (L)] as displayed on the menu window 105, and finally, clicks the menu item 110 as displayed on the select window 107, the CPU 41 creates the child object 115 including bar code [123]. After this, the CPU 41 allocates a group ID [1] which is the same as that of the parent object 112 to the child object 115 and then stores the result as a child object 115 which is ranked as fourth in the grouped link object, in the RAM 43 (S111: NO through S117).

Next, as shown in FIG. 20, the CPU 41 allocates an identification symbol 115A to the child object 115 including information such as bar code [123]. The identification symbol includes a group ID [1] which is represented by a number [1] displayed inside a square-shaped symbol. The CPU 41 then expands the layout 91 toward a rear side in a conveying direction (horizontally right direction), and additionally displays the child objects 115 toward a rear side of the child objects 114 in a conveying direction (S115). The CPU 41 then displays the outline 92 in a smaller size, so that the left end part thereof is connected to the layout 91.

If the user clicks the layout button 97, in the state shown in FIG. 17, with the mouse 7 to display the menu window 98 and then clicks the menu item 117 [Cancel link object (N)] with the mouse 7 (refer to FIG. 16), the CPU 41 may cancel the link relationship within a group composed of objects 101, 102 and 103.

If the user clicks again the layout button 97 with the mouse 7 to display the menu window 98 and then clicks the menu item 118 [Order (O)] (refer to FIG. 16) with the mouse 7, the CPU 41 may display a sequence update window of the respective objects 101, 102 and 103 for updating the ranking of objects. For instance, the objects 101, 102 and 103 may be displayed in the order of their ranking after which the ranking may be updated.

Then, objects 101, 102 and 103 are selected as was described earlier and a command is entered from the menu window to create link object from these objects. This makes it possible to create a link object wherein the parent object updated and then grouped (S15: YES through S16).

Next, sub-process [link object update process] executed at S17 will be described based on FIG. 13.

Figure 13:
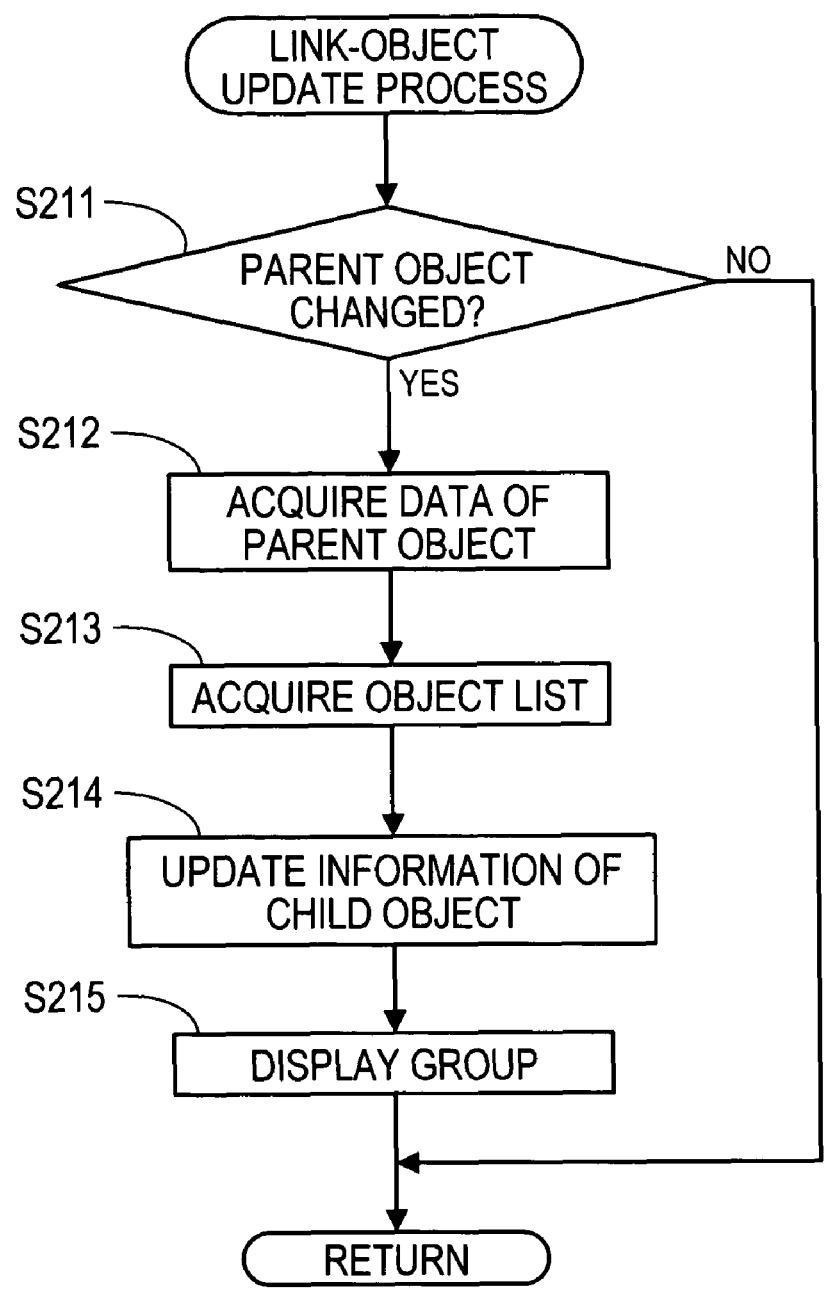
FIG. 13 is a sub-flow chart showing sub-processes of the [link object update process] as shown in FIG. 11.

As shown in FIG. 13, at S211, the CPU 41 first executes a judgment process for judging whether or not the parent object displayed on the layout 91 was clicked with mouse 7 for updating. If the parent object is not clicked with the mouse 7 for updating (S211: NO), the CPU 41 ends the sub-processes, after which the flow is reverted to the main flow chart, where the process S12 is executed.

Alternatively, if the parent object is clicked with mouse 7 for updating (S211: YES), the CPU 41 shifts the flow to process S212. At S212, the CPU 41 acquires the group ID which was allocated to the updated parent object and information included in the parent object thus updated, stores these items in the RAM 43.

Next, at S213, the CPU 41 reads out, from the RAM 43, all child objects to which the group ID was allocated, which group ID was allocated to the updated parent object. Specifically, the CPU 41 reads out the respective child objects that constitute the grouped link objects, from the RAM 43. The CPU 41 arranges the parent object and the child objects constituting the link objects thus grouped in the order of their ranking, and then stores the result in the RAM 43 as a list of objects to be updated.

At S214, the CPU 41 sequentially reads out the child objects from the list of objects to be changed in the order of their ranking, and then updates the information included the child objects to the information included in the updated parent object. Consequently, the CPU 41 allocates, to the child objects, a group ID which is the same as that of the parent object, and then stores the result in the RAM 43. Specifically, the information included in the child objects constituting the link object indicates information which is the same as that of the changed parent object.

Next, at step S215, the CPU 41 reads out again the parent object and the child objects to which the same group ID was allocated, from the RAM 43 and updates the objects on the layout 91 to the parent object and child objects that were changed, after which the result is displayed. The CPU 41 allocates the identification symbols showing the group ID to the changed parent object and child objects and displays them so as to allow identification of the parent object and child objects. For instance, the group ID allocated to the parent object is displayed as a number shown inside a circle symbol which accompanies the parent object. The group ID for each child object is displayed as a number shown inside a square-shaped symbol which accompanies the child object. Then, the CPU 41 ends the sub-process and shifts the flow to process S12 of the main flow chart.

Here, one example will now be described wherein a user updates the parent object and the child objects on the layout 91, based on FIG. 21 through FIG. 23.

Figure 21:
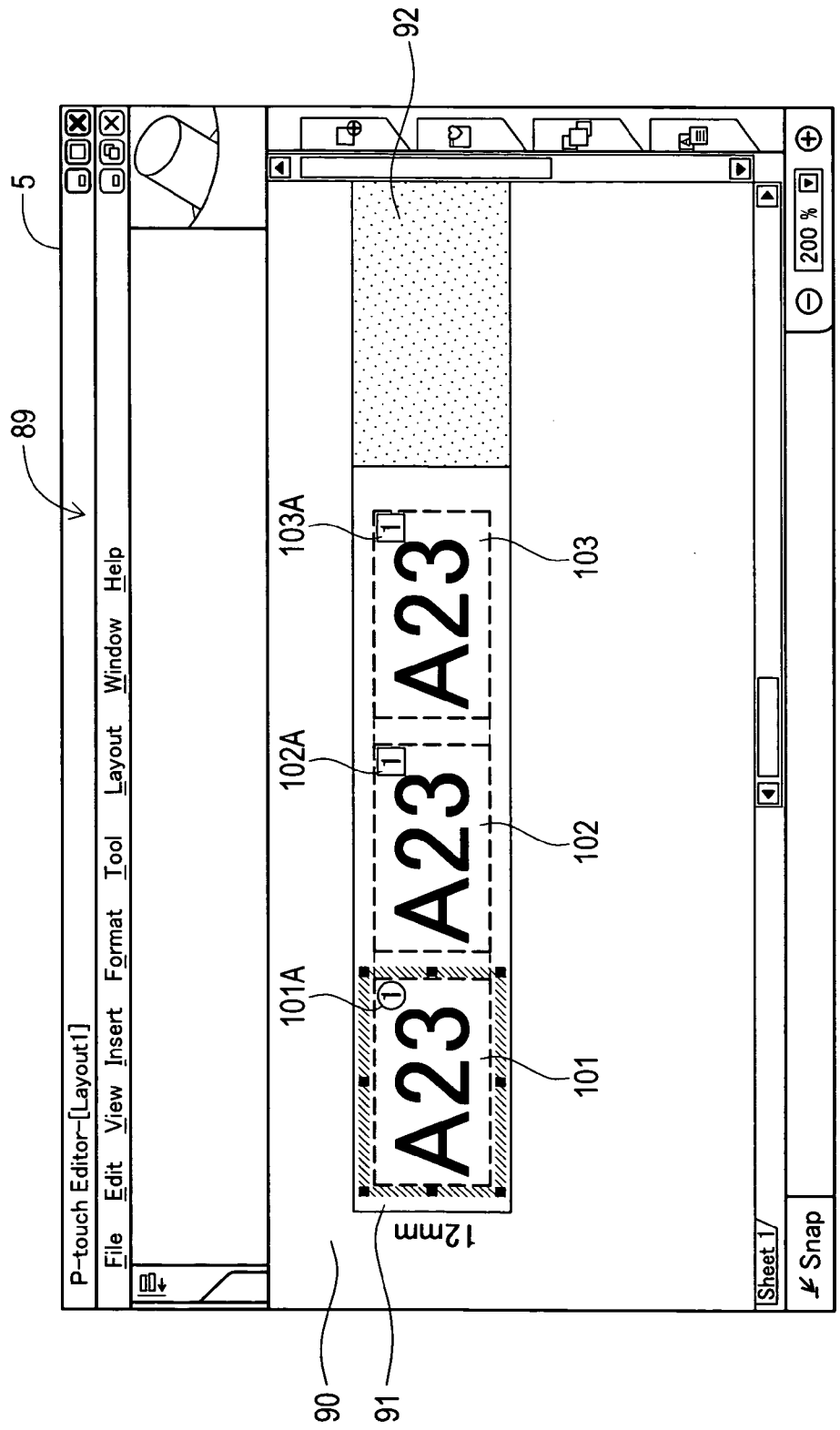
FIG. 21 is a view showing one example of updating the link object as shown in FIG. 17.

As shown in FIG. 21, if the user clicks the parent object 101 in FIG. 17 with the mouse 7 to cancel text [1] from text [123] and then enters text [A] to update to text [A23], the CPU 41 allocates to the parent object 101 including information such as text [A23], an identification symbol 101A including a number [1] in a circle symbol, and then displays the result. The CPU 41 updates text [123] in the child object 102 to text [A23] and displays this with the identification symbol 102A including a number [1] shown in a square-shaped symbol attached thereto. Further, the CPU 41 updates text [123] included in the child object 103 to text [A23] and displays this with the identification symbol 103A including number [1] shown in a square-shaped symbol attached thereto.

Figure 22:
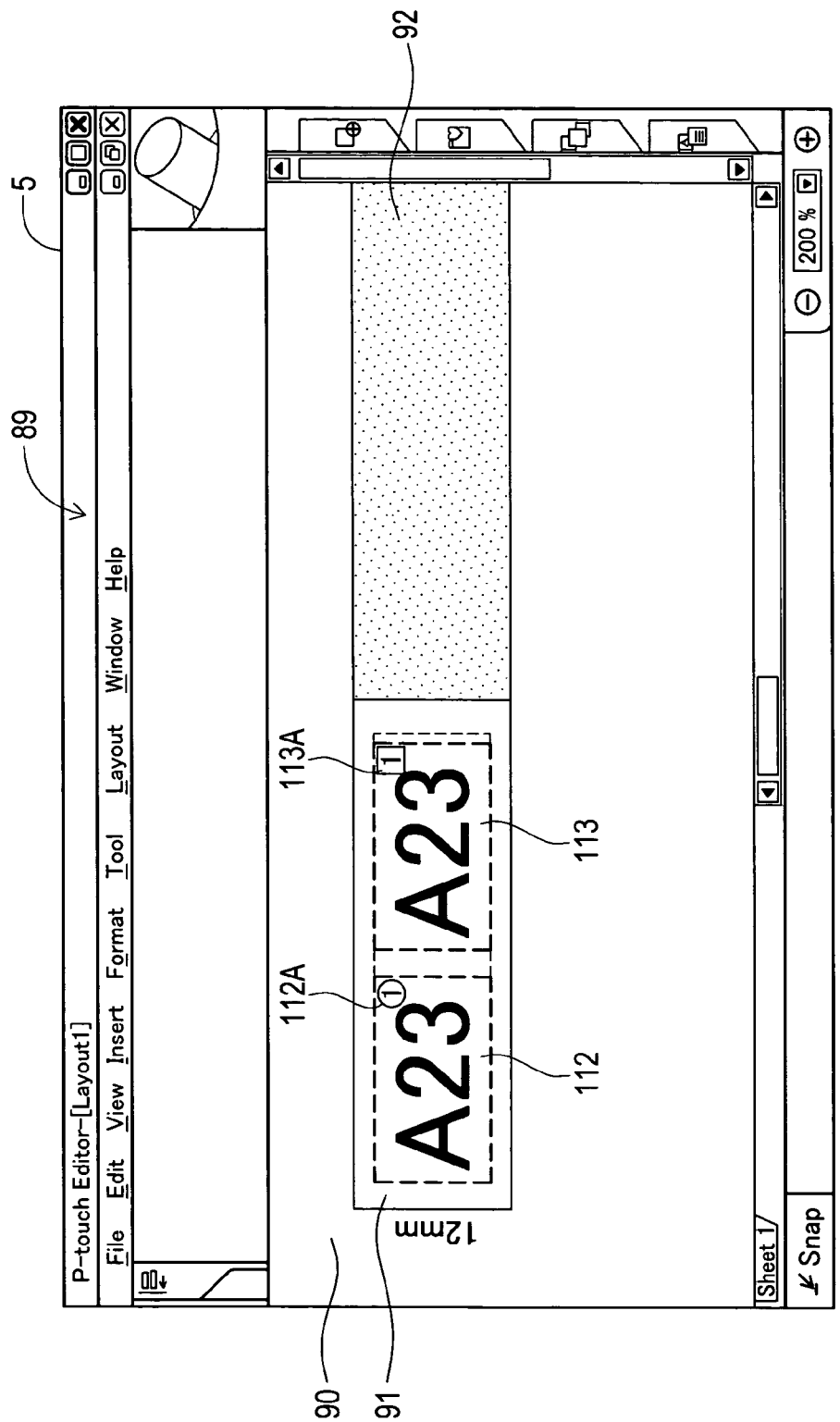
FIG. 22 is a view showing one example of updating the link object as shown in FIG. 19.

As shown in FIG. 22, if the user clicks the parent object 112 in FIG. 19 with the mouse 7 to cancel text [1] from text [123] and then enters text [A] to update to text [A23], the CPU 41 allocates to the parent object 112 including information such as text [A23] an identification symbol 112A including number [1] shown in a circle symbol, and then displays the result. The CPU 41 updates text [123] of the child object 102 to text [A23] and displays this with the identification symbol 102A including a square-shaped number [1] attached thereto. Further, the CPU 41 updates text [123] included in the child object 113 to text [A23] and displays this with the identification symbol 113A including number [1] shown in a square-shaped symbol, attached thereto.

Figure 23:
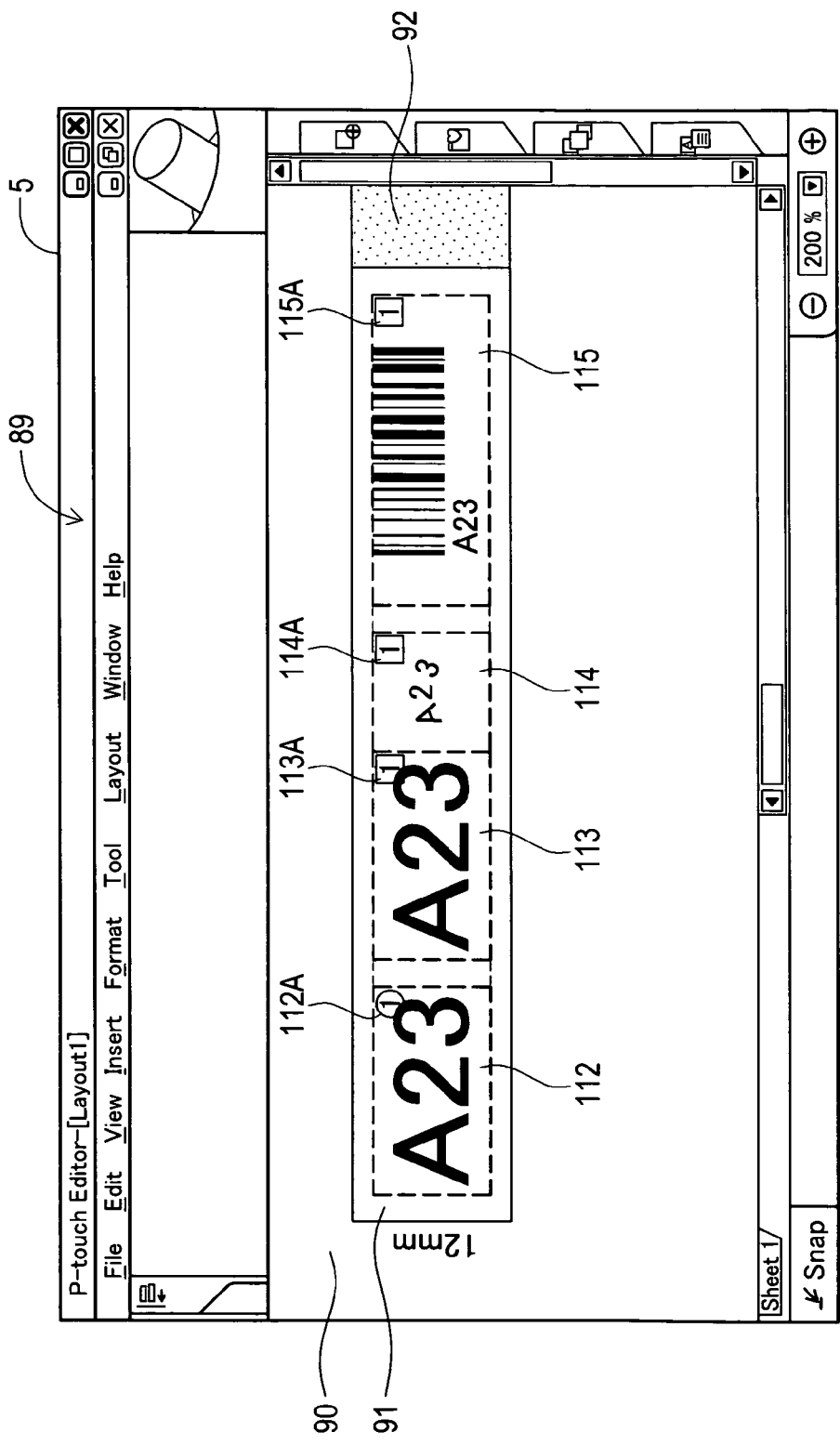
FIG. 23 is a view showing one example of updating the link object as shown in FIG. 20.

As shown in FIG. 23, if the user clicks the parent object 112 in FIG. 20 with the mouse 7 to cancel text [1] from text [123] and then enters text [A] to update to text [A23], the CPU 41 allocates to the parent object 112 including information such as text [A23] an identification symbol 112A including number [1] shown in a circle symbol, and then displays the result.

The CPU 41 updates text [123] included in the child object 113 to text [A23] and displays this with the identification symbol 113A including number [1] shown in a square-shaped symbol attached thereto. The CPU 41 updates word art [123] included in the child object 114 to word art [A23] and displays this with the identification symbol 114A including a square-shaped number [1] attached thereto. The CPU 41 updates bar code [123] included in the child object 115 to bar code [A23] and displays this with the identification symbol 115A including number [1] shown in a rectangular-shaped symbol attached thereto.

As was described earlier in detail, in the label printing system 1 according to the present embodiment, the user selects a plurality of objects including text, word art or bar code inside the print area 91A on the layout 91 and enters a command from the menu window for creating link objects. As a result, the plurality of objects in the print area are grouped, making it possible to set the objects to objects including a first type of information which is the same as the information included in the object ranked as first in the group (S111 through S115). Accordingly, the user can easily change the plurality of objects including text, word art or bar code that were entered to the print area 91A on the layout 91 to objects including a first type of information which is the same as the information for the parent object ranked as first.

The user can change the information included in the parent object and the child objects constituting the link object to be the same as the information included in the parent object simply by clicking the parent object from amongst the plurality of grouped objects with the mouse 7 to change the information included in the parent object (S211 through S215). Accordingly, the user can easily update all objects inside a group constituting the link objects to objects including the same first type of information simply by changing the information included in the parent object from amongst the plurality of objects entered to the print area 91A on the layout 91.

The user selects one object including text, word art or bar code inside the print area 91A on the layout 91 and enters a command from the menu window to create a link object. Thus, it is possible to create a link object for a group composed of a child object including the same information as the selected object (S111: NO through S116 through S115). Accordingly, the user can easily create, in a print area 91A on the layout 91, a plurality of objects including a first type of information and enter them as a group.

After the user enters a command from the menu window to cancel the link relationship of the link objects, a sequence update window is displayed for updating the ranking of the plurality of objects whose link relationship was cancelled. After updating the ranking of the plurality of objects, the user selects the plurality of objects once again and enters a command from the menu window to crate a link object. This makes it possible to create a link object wherein the parent object is updated and the plurality of objects are grouped again. Accordingly, the user changes the rank of the object including desired information, from amongst the plurality of objects on the layout 91, to first. This makes it possible to set the plurality of objects inside the print area 91A to an object including a first type of desired information.

Further, the identification symbol showing the group ID is allocated to the parent object and the child objects inside the print area 91A and is displayed so as to allow identification of the parent object and the child objects. Thus, if a plurality of types of link objects are displayed on the same layout 91, the user can easily identify the respective groups composed of the plurality of objects. The user can easily identify the parent object inside the respective groups. Accordingly, the user easily selects the link objects that were grouped as desired to change the parent object, which makes it possible to swiftly change all objects in a desired group.

The disclosure is not limited to the above-described embodiment and various improvements and modifications can be made thereto without departing from the spirit of the disclosure. For instance, in FIG. 17, FIG. 19, FIG. 20 through FIG. 23, the CPU 41 may allocate, to the parent objects 101 and 112, the identification symbols 101B and 112B including a group ID [1] which shows [1] inside a red square frame. Also, the CPU 41 may allocate, to the child objects 102, 103, 113, 114 and 115, the identification symbols 102B, 103B, 113B, 114B and 115B including a group ID [1] which shows [1] inside a blue square frame. Specifically, this process may be carried out simply by changing the color of the identification symbols allocated to the parent objects and the identification symbols allocated to the child objects. Accordingly, the user can easily identify the parent objects 101 and 112.

In FIG. 17, FIG. 19, FIG. 20 through FIG. 23, the CPU 41 may allocate the identification symbols showing a group ID only to the parent objects 101 and 112. The user can thus easily identify the parent objects 101 and 112.

While the presently exemplary embodiment has been shown and described, it is to be understood that this disclosure is for the purpose of illustration and that various changes and modifications may be made without departing from the scope of the disclosure as set forth in the appended claims.

What is claimed is:

1. A label data creating apparatus comprising:
a display having a display screen; a layout display unit that displays a layout of a long print medium onto which print data is to be printed, in the display screen of the display; an input device that is used in inputting a plurality of objects in a print area of said layout; said plurality of objects each including printable information which is one of text, word art or bar code information; an object storage unit that stores said plurality of objects inputted through the input device, said plurality of objects having a rank allocated thereto; a select device that is used in selecting said plurality of objects inputted into the print area; and a link object setting unit that, in a case where said plurality of objects are selected by the select device, sets an object ranked as first from amongst said plurality of objects thus selected as a parent object, and sets the remaining of said plurality of objects ranked as second or lower as child objects for creating a group;
wherein the printable information in the child objects is automatically updated to include identical printable information as the parent object when grouped and when printable information in the parent object is thereafter changed; and
said child objects are automatically displayed so as to be disposed toward a rear side of the parent object in a print direction, and each of the parent object and said child objects in said group each include a group ID symbol, wherein the child objects have a substantially same illustration of said group ID symbol, which differs from said parent object.

2. The label data creating apparatus according to claim 1, wherein in a case where one object is inputted in the print area of said layout by the input device and the one object inputted by the input device is selected by the select device, the link object setting unit sets the one object selected by the select device as a parent object and automatically creates a child object including printable information identical with the parent object, for creating a group; and
the child object is automatically displayed so as to be disposed at a rear side of the parent object in the print direction, and the parent object and said child object in said group each are indicated with a group ID symbol which is recognizable as said group and distinguishable between the parent object and the child object in said group.

3. The label data creating apparatus according to claim 1, further comprising a rank change unit that changes the rank allocated to said plurality of objects.

4. A label data creating method comprising:
a layout display step of displaying a layout of a long print medium onto which print data is printed, on a display screen of a display; an input step of inputting a plurality of objects to a print area of said layout displayed in said layout display step, through an input device; said plurality of objects each including printable information which is one of text, word art or bar code information; an object storage step of storing said plurality of objects inputted in said input step, said plurality of objects having a rank allocated thereto; and a link object setting step of setting, in a case where said plurality of objects which are inputted to the print area in said input step are selected by a select device, an object ranked as first from amongst said plurality of objects thus selected and stored in the object storage step, as a parent object, and setting the remaining of said plurality of objects ranked as second or lower as child objects for creating a group; and wherein the printable information in the child objects is automatically updated to include identical printable information as the parent object when grouped and when printable information in the parent object is thereafter changed; and said child objects are automatically displayed so as to be disposed toward a rear side of the parent object in a print direction, and the parent object and said child objects in said group each include a group ID symbol, wherein the child objects have a substantially same illustration of said group ID symbol, which differs from said parent object.

5. The label data creating method according to claim 4, wherein in a case where one object is inputted in the print area of said layout by the input device in the input step and the one object inputted by the input device is selected by the select device in the link object setting step, the one object selected by the select device is set as a parent object and a child object including printable information identical with the parent object is automatically created, for creating a group; and the child object is automatically displayed so as to be disposed at a rear side of the parent object in the print direction, and the parent object and said child object in said group each are indicated with a group ID symbol which is recognizable as said group and distinguishable between the parent object and the child object in said group.

6. The label data creating method according to claim 4, further comprising a rank change step of changing the rank allocated to said plurality of objects.

7. A computer program product stored in a non-transitory computer readable recording medium, wherein the computer program product includes:

a layout display step of displaying a layout of a long print medium onto which print data is printed, on a display screen of a display; an input step of inputting a plurality of objects to a print area of said layout displayed in said layout display step, through an input device; said plurality of objects each including printable information which is one of text, word art or bar code information; an object storage step of storing said plurality of objects inputted in said input step, said plurality of objects having a rank allocated thereto; and a link object setting step of setting, in a case where said plurality of objects which are inputted to the print area in said input step are selected by a select device, an object ranked as first from amongst said plurality of objects thus selected and stored in the object storage step, as a parent object, and setting the remaining of said plurality of objects ranked as second or lower as child objects for creating a group; and wherein the printable information in the child objects is automatically updated to include identical printable information as the parent object when grouped and when printable information in the parent object is thereafter changed; and said child objects are automatically displayed so as to be disposed toward a rear side of the parent object in a print direction, and the parent object and said child objects in said group each include a group ID symbol, wherein the child objects have a substantially same illustration of said group ID symbol, which differs from said parent object.

8. The computer program product according to claim 7, wherein in a case where one object is inputted in the print area of said layout by the input device in the input step and the one object inputted by the input device is selected by the select device in the link object setting step, the one object selected by the select device is set as a parent object and a child object including printable information identical with the parent object is automatically created, for creating a group; and the child object is automatically displayed so as to be disposed at a rear side of the parent object in the print direction, and each of the parent object and said child object in said group is indicated with a group ID symbol which is recognizable as the said group and distinguishable between the parent object and the child object in said group.

9. The computer program product according to claim 7, wherein the computer program further includes: a rank change step of changing the rank allocated to said plurality of objects.

* * * * *